INVENTOR.
DALLAS V. FRANKE
BY Lyon & Lyon
ATTORNEYS

INVENTOR.
DALLAS V. FRANKE
BY Lyon & Lyon
ATTORNEYS

April 10, 1956 D. V. FRANKE 2,741,760

SYSTEM FOR VISUALLY CHECKING ALIGNMENT OF COMPUTER-TRACKING LOOP CIRCUITRY

Filed June 2, 1952 12 Sheets-Sheet 3

INVENTOR.
DALLAS V. FRANKE
BY Lyon & Lyon
ATTORNEYS

INVENTOR.
DALLAS V. FRANKE
BY
Lyon & Lyon
ATTORNEYS

April 10, 1956 D. V. FRANKE 2,741,760

SYSTEM FOR VISUALLY CHECKING ALIGNMENT OF COMPUTER-TRACKING LOOP CIRCUITRY

Filed June 2, 1952 12 Sheets-Sheet 5

INVENTOR.
DALLAS V. FRANKE

BY Lyon & Lyon

ATTORNEYS

INVENTOR.
DALLAS V. FRANKE
BY Lyon & Lyon
ATTORNEYS

INVENTOR.
DALLAS V. FRANKE
BY Lyon & Lyon
ATTORNEYS

INVENTOR.
DALLAS V. FRANKE
BY Lyon & Lyon
ATTORNEYS

April 10, 1956 D. V. FRANKE 2,741,760

SYSTEM FOR VISUALLY CHECKING ALIGNMENT OF COMPUTER-TRACKING LOOP CIRCUITRY

Filed June 2, 1952 12 Sheets-Sheet 9

INVENTOR.
DALLAS V. FRANKE

BY Lyon & Lyon

ATTORNEYS

INVENTOR.
DALLAS V. FRANKE
BY Lyon & Lyon
ATTORNEYS

April 10, 1956 D. V. FRANKE 2,741,760

SYSTEM FOR VISUALLY CHECKING ALIGNMENT OF COMPUTER-TRACKING LOOP CIRCUITRY

Filed June 2, 1952 12 Sheets-Sheet 11

INVENTOR.
DALLAS V. FRANKE
BY Lyon & Lyon
ATTORNEYS

April 10, 1956 D. V. FRANKE 2,741,760

SYSTEM FOR VISUALLY CHECKING ALIGNMENT OF COMPUTER-TRACKING LOOP CIRCUITRY

Filed June 2, 1952 12 Sheets-Sheet 12

INVENTOR.
DALLAS V. FRANKE
BY Lyon & Lyon
ATTORNEYS

United States Patent Office 2,741,760

Patented Apr. 10, 1956

2,741,760

SYSTEM FOR VISUALLY CHECKING ALIGNMENT OF COMPUTER-TRACKING LOOP CIRCUITRY

Dallas Valo Franke, Redondo Beach, Calif., assignor to Gilfillan Bros. Inc., Los Angeles, Calif., a corporation of California Application June 2, 1952, Serial No. 291,139

11 Claims. (Cl. 343—10)

The present invention relates to improved means and techniques for visually checking the alignment, or predetermined ideal course lines and glidepaths as computed electronically in an automatic ground control approach (AGCA) system.

More specifically, the present invention relates to means and techniques whereby the ideal glidepath and course line which are computed electronically, using the apparatus described and claimed in my copending application, Serial No. 266,001 filed January 11, 1952 for determining the deviation of aircraft from such course line and glidepath, may be observed visually on a cathode ray tube.

In my last mentioned copending application, means are shown for developing a voltage characteristic, the intensity of which is representative of the range of an aircraft being tracked, and also, means are disclosed for combining such electrical characteristic with voltages representing the angular position of an antenna beam scanning through the aircraft approach zone for purposes of developing an alternating voltage, the cross-over points of which represent the ideal glidepath or course line, as the case may be. The locus of these cross-over points constitutes the glidepath and course line respectively.

In developing such alternating voltages, non-linear circuits, such as thyrite, are used to compensate for the fact that the situs of the radar antenna is adjacent to the aircraft landing field and is thus not coincident with the aircraft touchdown point.

The present arrangement contemplates a switching operation whereby the range tracking and computing system is essentially reversed, such that the computing system which is normally supplied with range information from the range tracking unit, is fed a voltage representing the angular position of the antenna beam. The computing system in such instance generates a "range" voltage which is returned to the range tracking unit.

In such instance, when the computing system is thus reversed, the output from the range tracking unit is essentially a tracking gate or pip which is delayed in time, with respect to the system trigger, in an amount representative of the angular position of the antenna beam. This pip, in the form of video, is displayed on the cathode ray tube, and the resulting lines and dots, as the scan is continued, is compared to a fixed cursor or other visual reference lines, such cursor or visual reference lines being preferably produced using the apparatus and teachings described in my copending application, Serial No. 266,002 filed January 11, 1952.

In an AGCA system, two antennas are used to scan the approach zone to an aircraft landing field, one of such antennas scans in the horizontal or azimuth plane, while the other antenna scans on a time sharing basis with the previously mentioned antenna, in the elevation plane. A voltage, termed the antenna beam angle voltage, is developed, the instantaneous magnitude of such voltage serving as a measure of the angular position of the azimuth antenna beam or the elevation antenna beam, as the case may be.

Also, the AGCA system incorporates means for automatically tracking the aircraft in its flight from a range ten miles remote from the aircraft touchdown point; and, during such tracking operation, a voltage, termed the range voltage, is developed, the instantaneoues magnitude of such range voltage serving as a measure of the distance of the tracked aircraft from the situs of the radar equipment. For obvious reasons, the situs of the radar equipment is adjacent the aircraft landing field and, of course, the situs does not correspond to the aircraft touchdown point.

The general purpose of the AGCA system is to develop, at the situs of the radar equipment, control signals for transmission to the autopilot approach coupler of the aircraft, so that such aircraft automatically flies along a predetermined glidepath (in the elevation plane) and along a predetermined course line (in the horizontal or azimuthal plane). These control signals cause the aircraft to fly up and down with respect to such glidepath, or to the right or left of the course line as required for flight along such glidepath and course line.

In developing such control voltages, an electronic computation is effectively made of the instantaneous location of the aircraft with respect to the predetermined glidepath and course line. In effecting such electronic computation, the predetermined ideal glidepath and course line are each represented by an electrical quantity, in this case, such quantity being an alternating voltage, the zero, or cross-over points of which, correspond to the ideal glidepath or course line, as the case may be.

In developing such alternating voltages, it is necessary to take into consideration the fact that the situs of the radar equipment is not coincident with the aircraft touchdown point.

The aforementioned electrical quantity, representing the glidepath and course line, is obtained, in general, by combining the aforementioned azimuth antenna or elevation antenna angle voltage as the case may be, with the aforementioned range voltage. By thus correlating the angular position of the antenna beam, with the range of an aircraft being tracked, the position of the aircraft is determined. However, certain compensation must be made for the aforementioned non-coincident relationship between the situs of the radar equipment and the aircraft touchdown point. This compensation is made using a non-linear circuit parameter such as thyrite for purposes of modifying the range voltage before the range voltage thus modified is used for comparison purposes with the azimuth or elevation antenna beam voltage, as the case may be.

In normal operation of the AGCA system, such ideal glidepath and course line as electronically computed and represented by the cross-over points of an alternating voltage, are not visible. The present invention is directed to means and techniques whereby the ideal glidepath and course line, as represented by cross-over points on an alternating voltage are rendered visible on a cathode ray tube for purposes of checking the operation of the AGCA system for making adjustments, generally, and for alignment purposes.

It is therefore an important object of the present invention to provide improved means and techniques whereby the aforementioned results are accomplished.

A specific object of the present invention is to provide means and techniques, whereby a glidepath and course line, as electronically computed in the normal functions of the AGCA equipment, are rendered visible on a cathode ray tube by a simple switching operation requiring essentially no other circuit elements than those used in the normal function of the AGCA system.

Another specific object of the present invention is to provide improved means and techniques useful in effecting a visible representation of a course line and glidepath which is computed electronically.

Another specific object of the present invention is to provide apparatus for visually presenting an ideal glidepath and course line, using as a controlling element of the circuitry, the non-linear thyrite, which is essential in computation of the ideal course line and glidepath in the normal functioning of the AGCA equipment.

Another specific object of the present invention is to provide circuitry for visually presenting a glidepath and course line as computed electronically, even though the data for such purpose is obtained from radar equipment non-coincident with the touchdown point.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows in schematic form apparatus for scanning the approach zone to an aircraft landing field with related circuitry for producing a visual indication of the character illustrated in Figure 6; also this apparatus serves to develop information such as azimuth angle voltage, elevation angle voltage, video, blanking voltages and az.-el. relay voltages used in the automatic ground controlled approach (AGCA) system illustrated in Figure 7.

Figure 9:
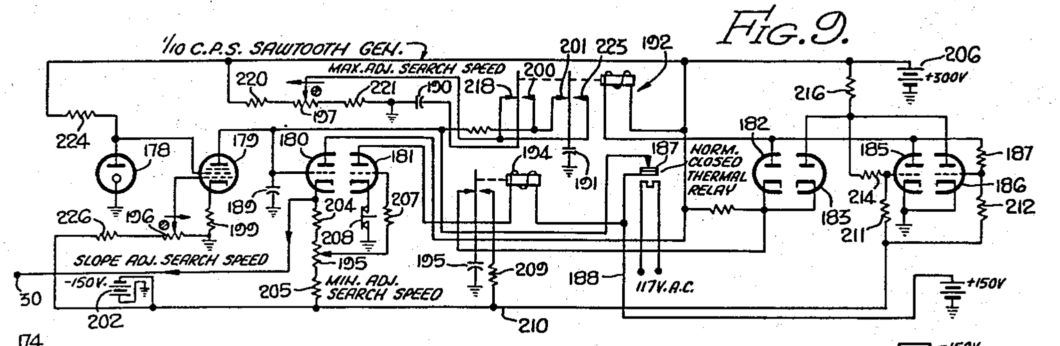
Figure 7:
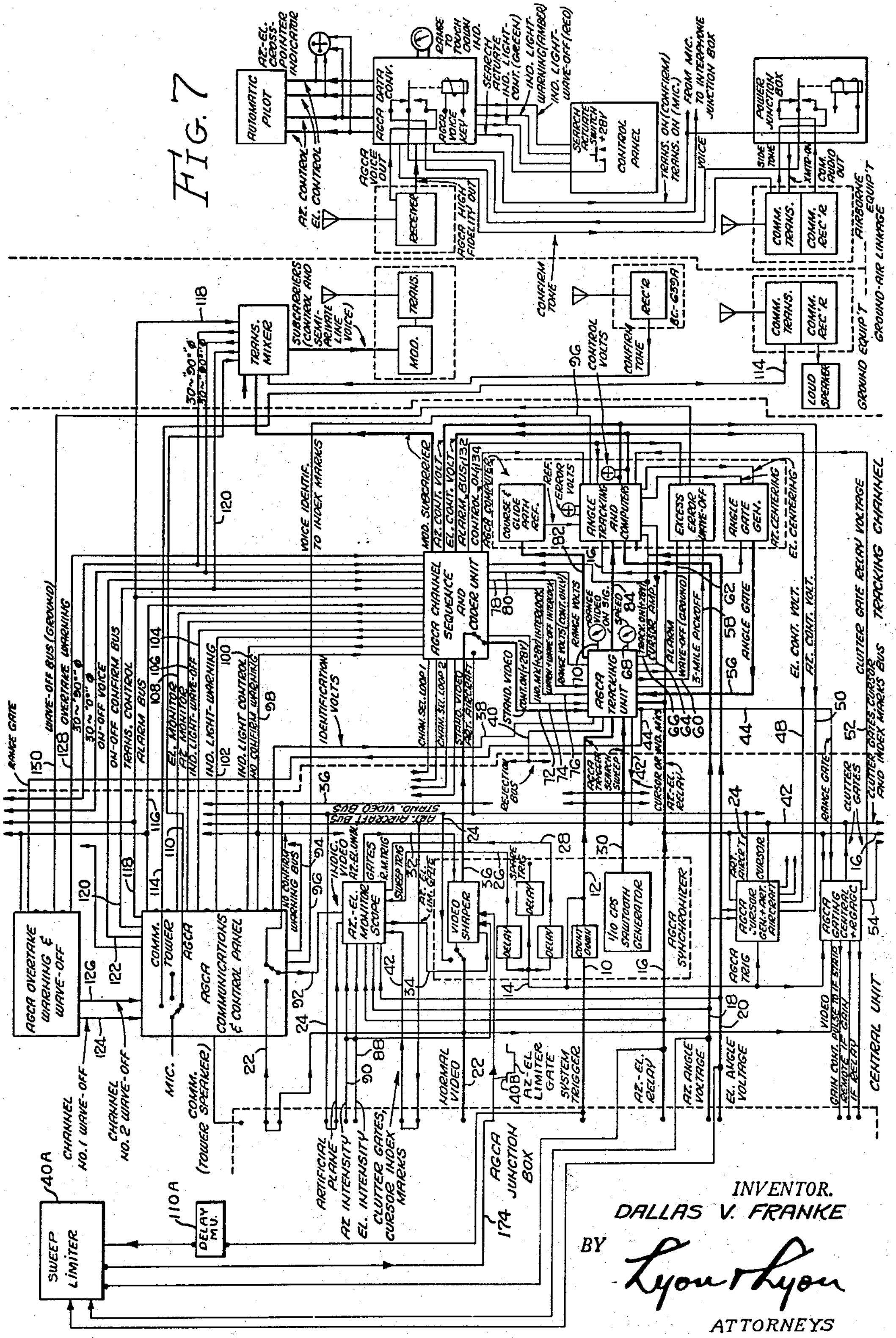
Figure 7 is a block diagram of an AGCA system embodying features of the present invention which is supplied with certain information developed by the apparatus illustrated in Figure 1.
Figures 10, 14:
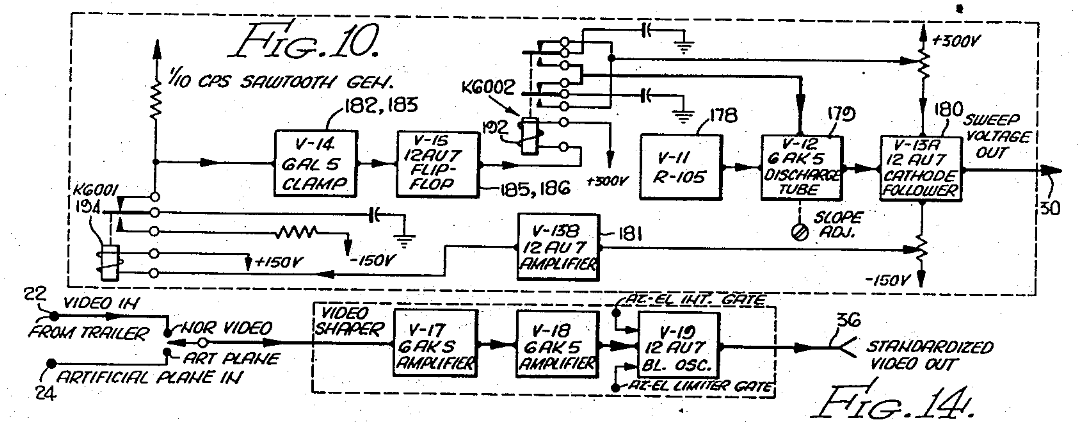
Figure 11:
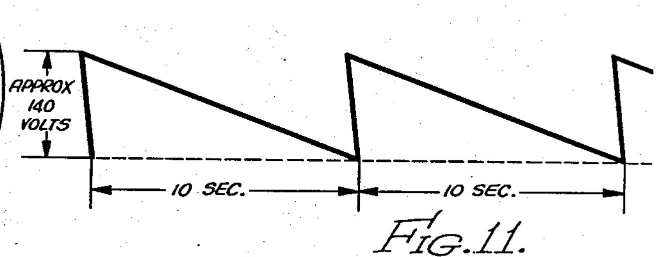

Figure 9 illustrates the circuitry of the one-tenth cycle per second sawtooth generator which is also illustrated as such in block form in Figure 7, such sawtooth generator producing a sawtooth voltage wave of the character illustrated in Figure 11, which is used during the so-called "search" function of the AGCA equipment, it being noted that the circuitry of Figure 9 is illustrated in block form in Figure 10.

Figure 10 illustrates in block diagram form the circuitry illustrated in Figure 9.

Figure 11 illustrates the sawtooth wave form developed by the apparatus illustrated in Figures 9 and 10.

Figure 12:
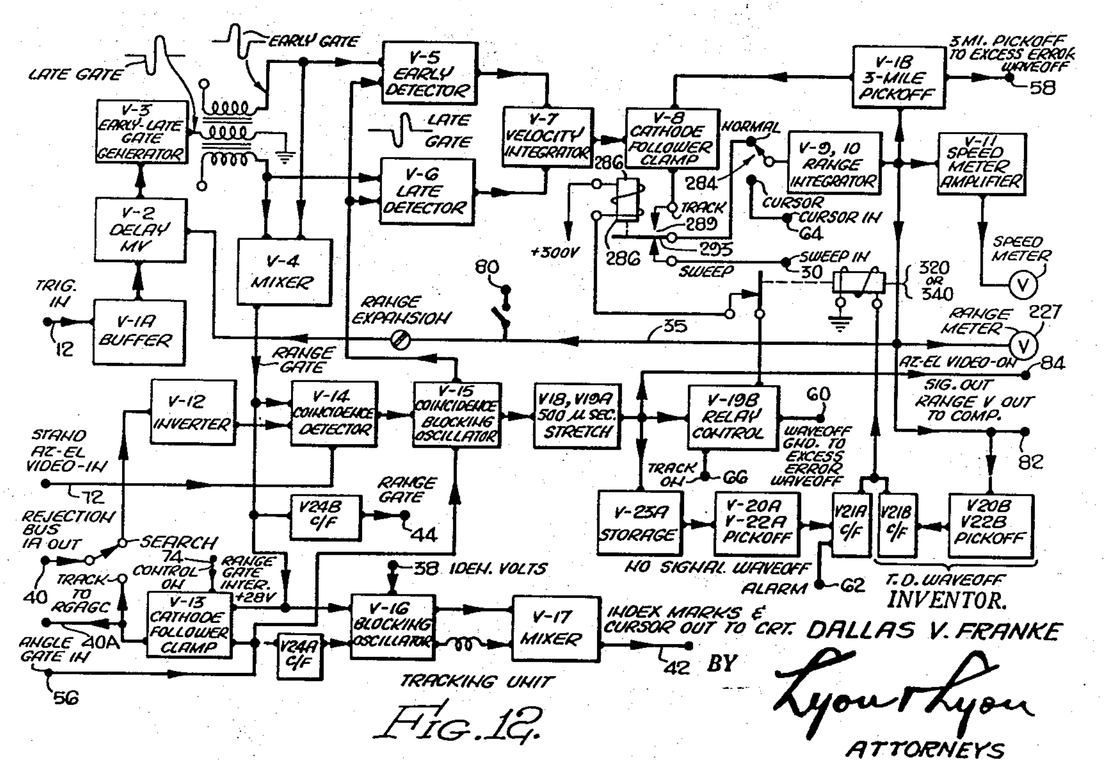
Figure 13:
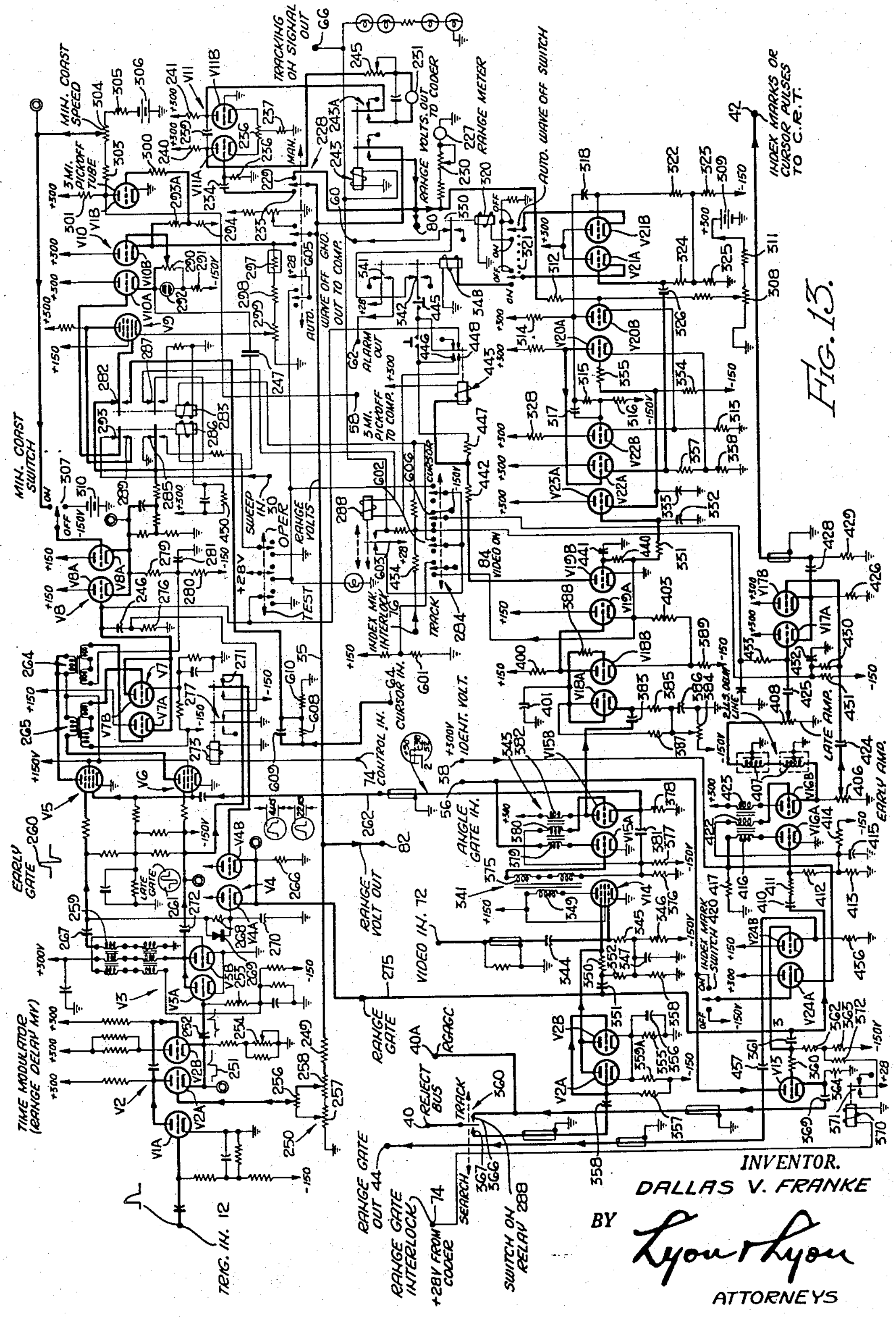

Figure 12 illustrates in block diagram form the circuitry of the AGCA tracking unit indicated as such in Figure 7, such circuitry being illustrated in detail in Figure 13.

Figure 13 represents in schematic form the circuitry of the AGCA tracking unit illustrated in Figures 7 and 12.

Figure 8:
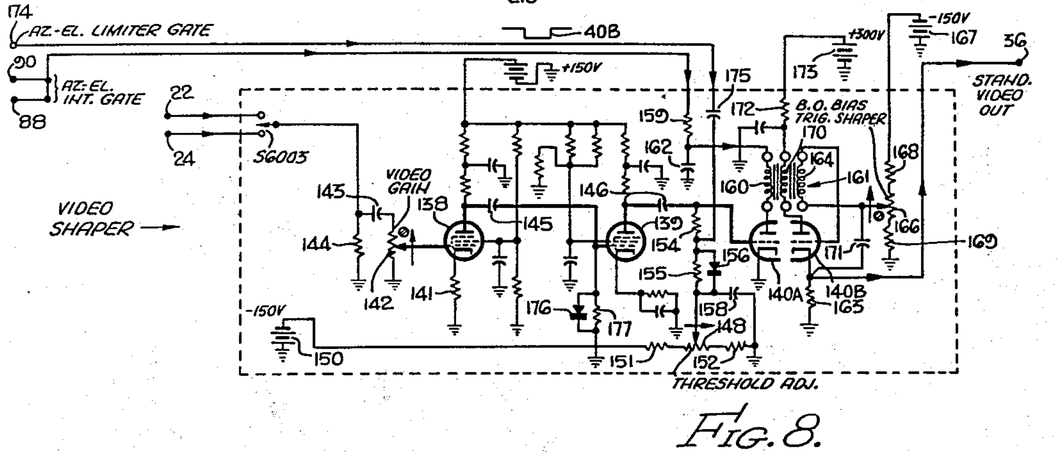
Figure 8 illustrates in schematic form circuitry of the video shaper which is indicated as such in Figure 7 and which is indicated in block diagram form in Figure 14.

Figure 14 illustrates in block diagram form the circuitry of the video shaper, the circuitry of which is illustrated in Figure 8, the video shaper also being indicated as such in Figure 7.

Figure 15:
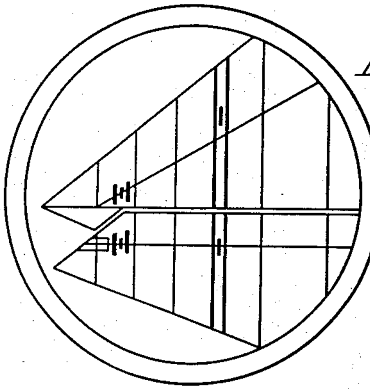

Figure 15 serves to illustrate the visual indication obtained of an aircraft being tracked with the bracketing index marks in one instance being limited by angle gating, while in the other instance being extended in the absence of angle gating.

Figure 16:
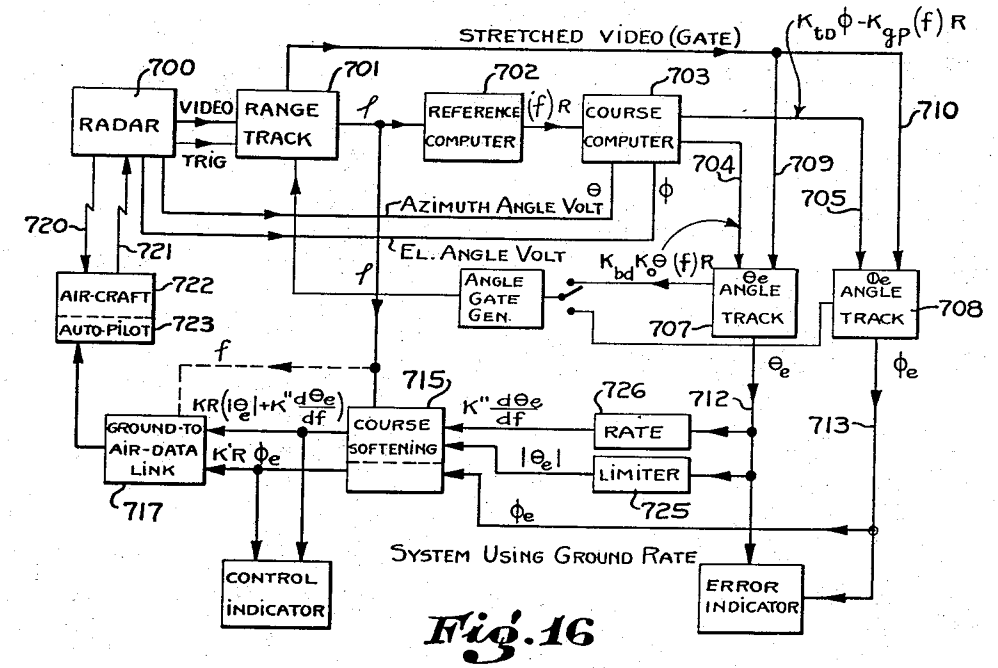
Figure 17:
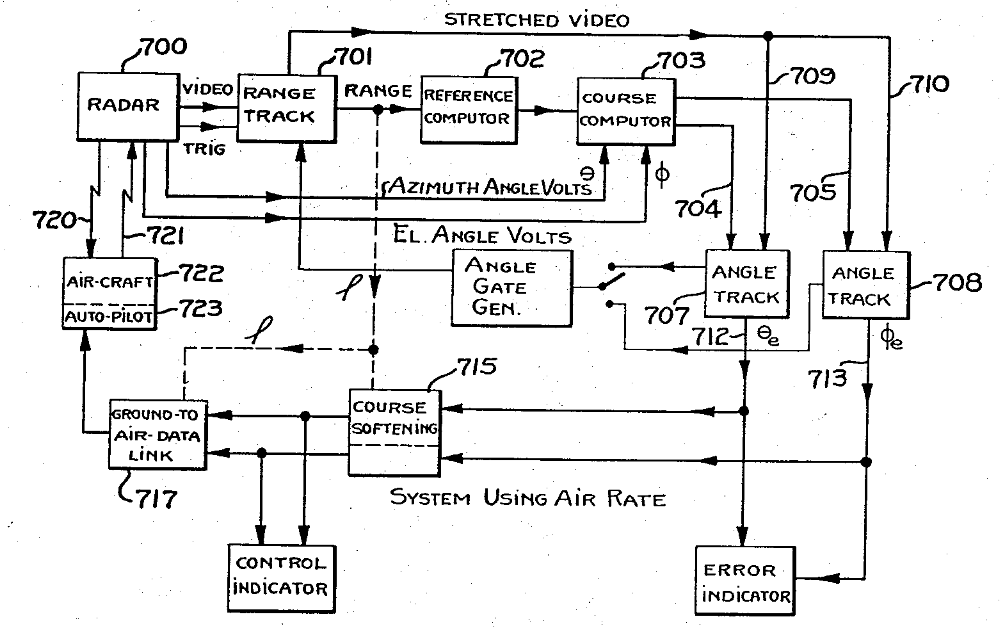

Figures 16 and 17 illustrate in block diagram form different elements of the AGCA system and their functional inter-relationship when the system is adjusted respectively to use ground rate and air rate information.

Figure 18A:
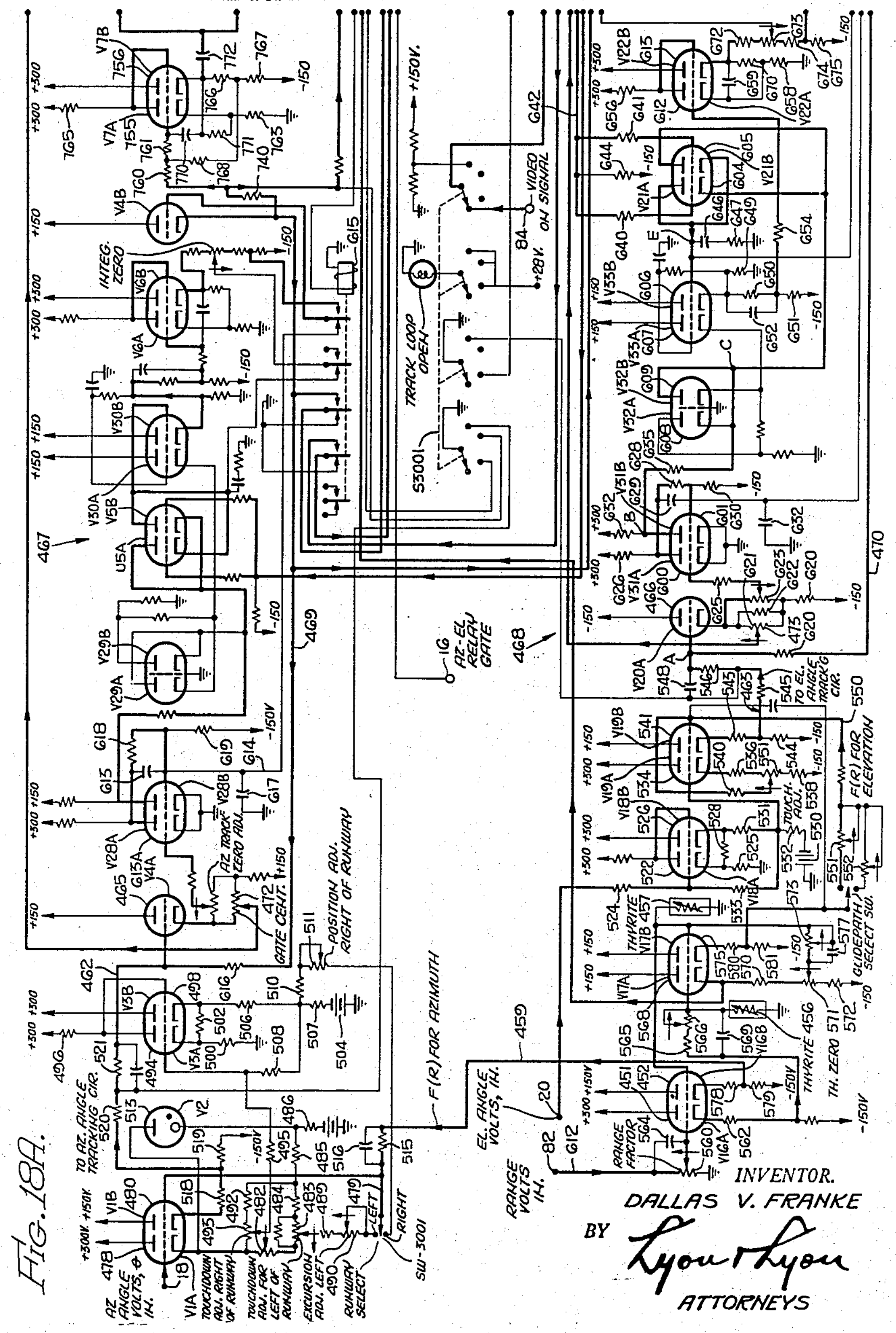
Figure 18B:
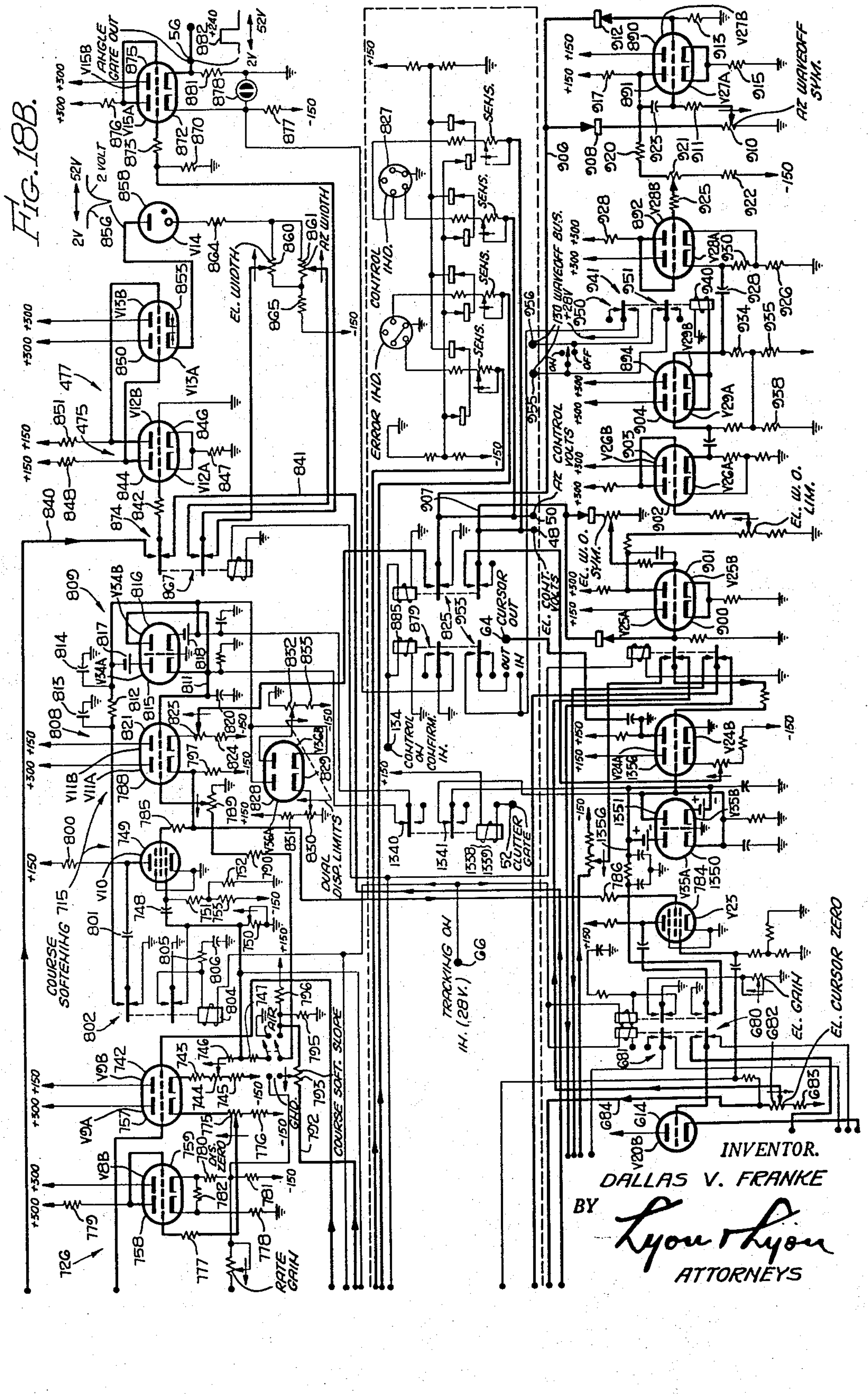
Figure 19:
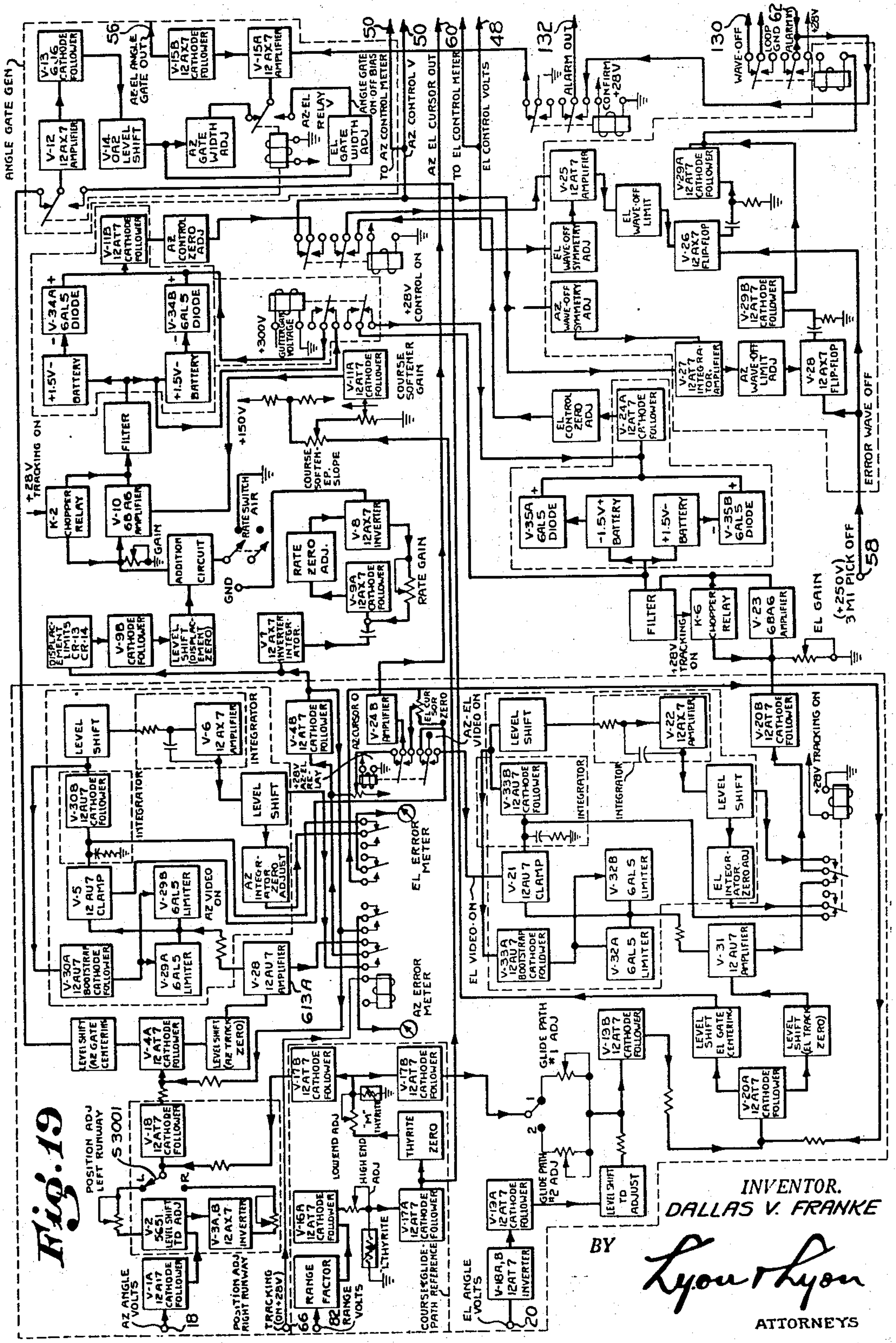

Figures 18A and 18B, interconnected as illustrated, constitute Figure 18, which is a schematic representation of the apparatus in the angle tracking and computer unit illustrated as such in Figure 7, such circuitry of Figures 18A, 18B being illustrated also in block diagram form in Figure 19.

Figure 20:
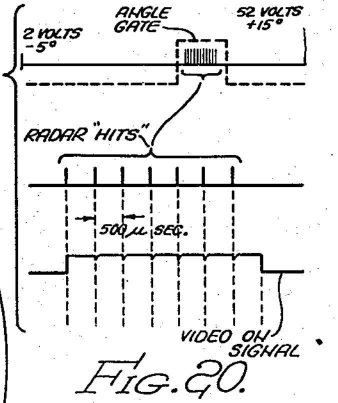

Figure 20 illustrates the character of the "stretched" video or video "on" signal, such signal constituting in general an elongated wave having a time duration equal to the time during which radar "hits" are being made on an aircraft plus a fixed time interval in the order of 500 microseconds.

Figures 21, 22:
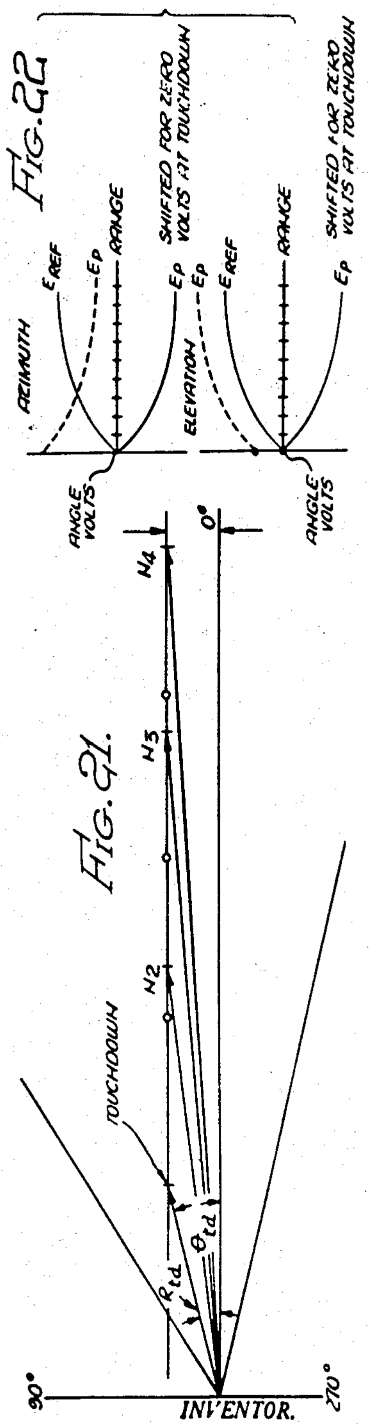

Figure 21 illustrates the geometrical conditions existing in the azimuth plane, with the radar equipment located adjacent the runway center line and in relationship to the touchdown point, such figure being useful in appreciating features of the computer illustrated in Figures 18A, 18B and 19.

Figure 22 is useful in explaining the manner in which the azimuth and elevation beam angle voltages are modified for purposes of comparison with a reference voltage developed in the computer unit.

Figure 23:
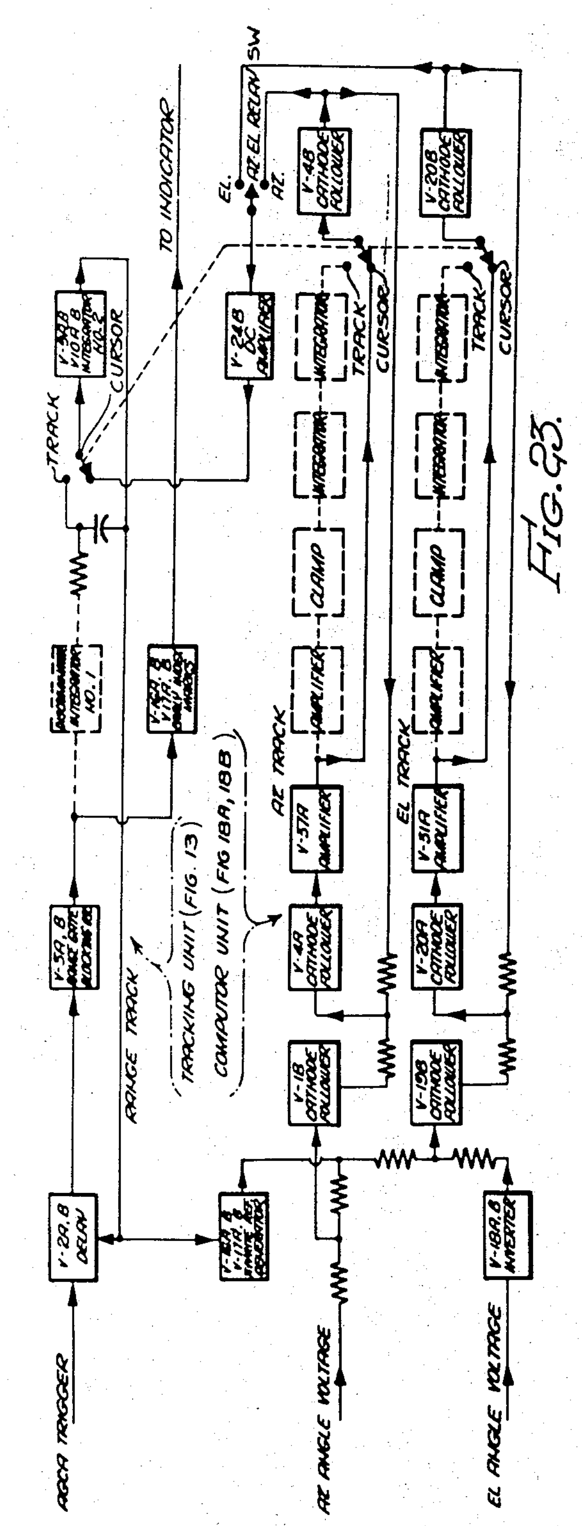

Figure 23 illustrates the manner in which the circuitry in the tracking unit and computer unit is modified so as to provide a visual reproduction on the cathode ray tube of both the azimuth course line and elevation glidepath, which are computed by using thyrite elements in the normal operation of the computer unit.

Figure 6:
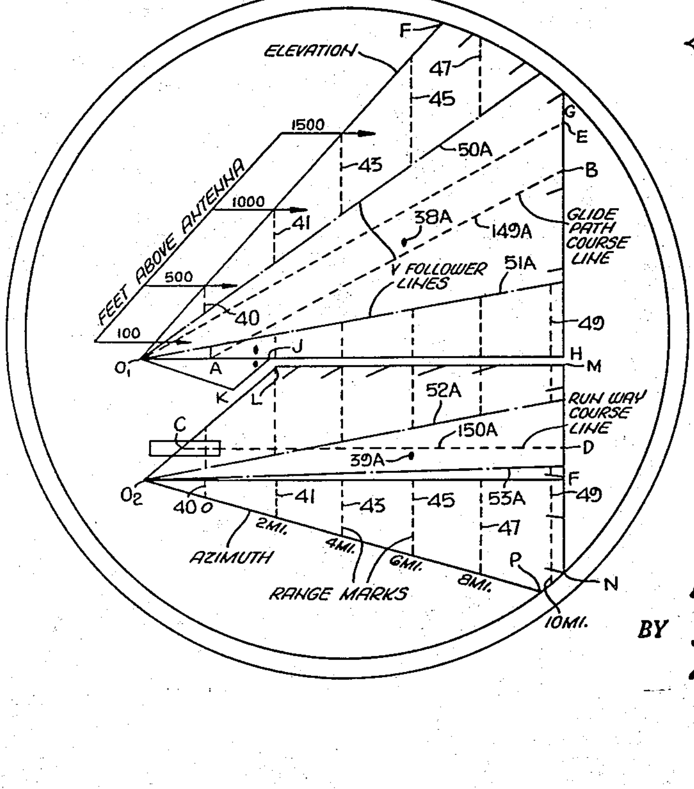
Figure 6 illustrates the display obtained using the apparatus illustrated in Figure 1, the elevation and azimuth displays being produced sequentially on a time sharing basis.
Figure 24:
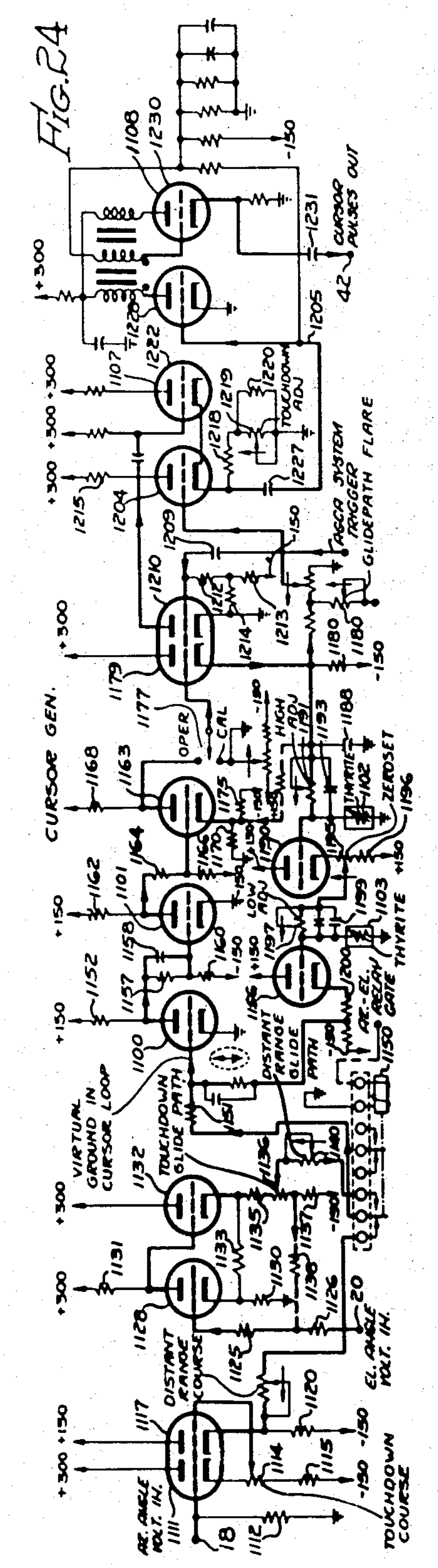
Figure 25:
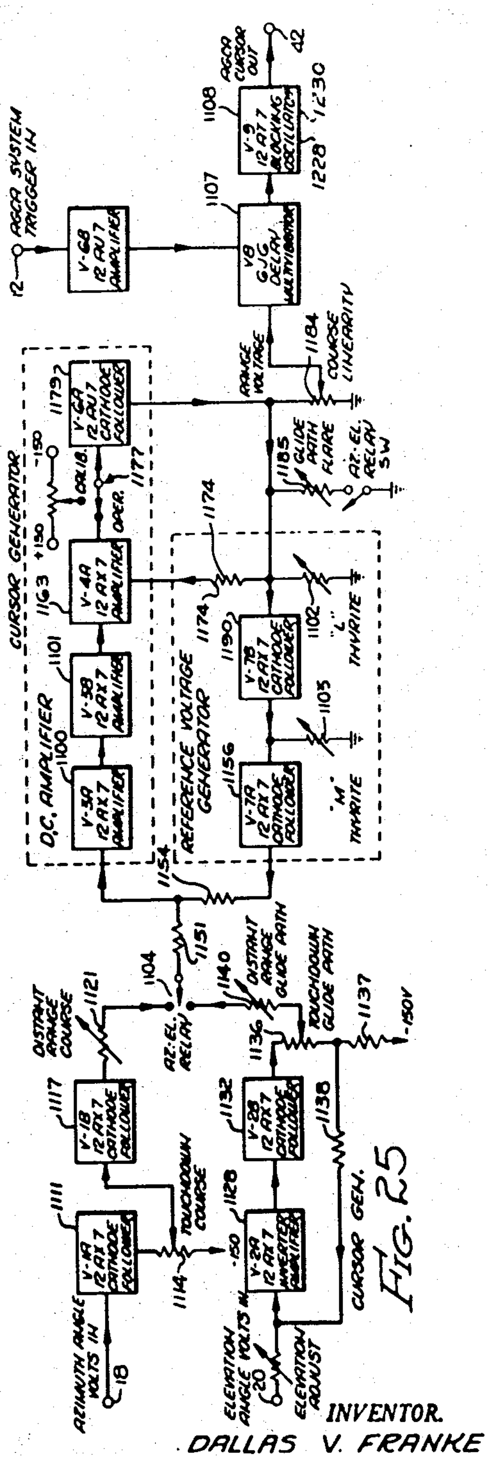

Figure 24 illustrates in schematic form the circuitry of a cursor generator useful in the production of the glidepath course line and runway course line illustrated as such in Figure 6, such circuitry being illustrated in block diagram form in Figure 25.

Figure 25 represents in block diagram form circuitry of the cursor generator illustrated in schematic form in Figure 24 and incorporated in the unit designated "AGCA Cursor Generator and Artificial Aircraft" unit in Figure 7.

Figures 26, 27, 28, 29, 30:
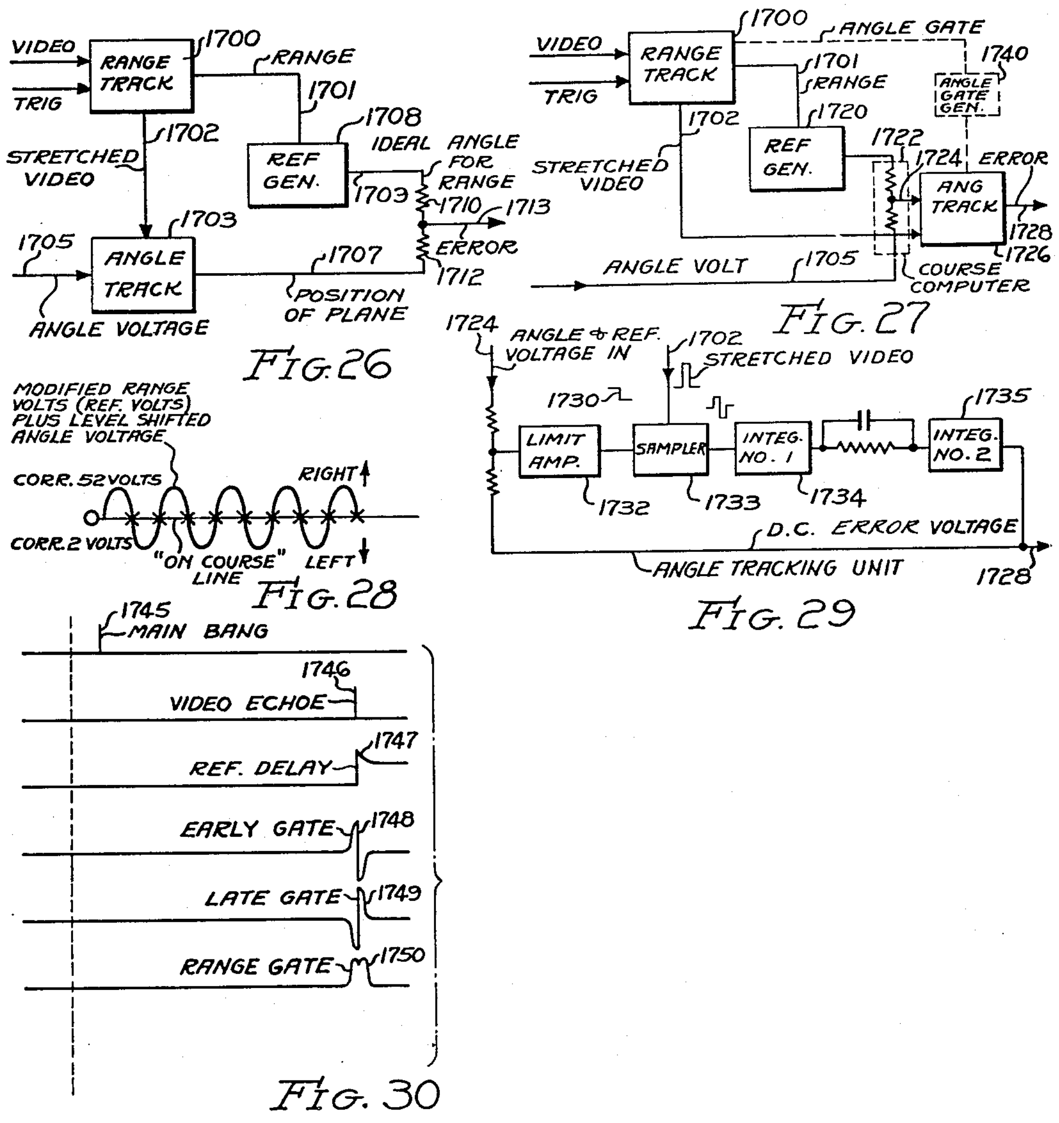

Figure 26 illustrates a modified arrangement and is useful in illustrating certain concepts present in the AGCA system.

Figure 27 is a block diagram similar to Figure 26 and serves to illustrate the functional relationship of certain units of the AGCA equipment.

Figure 28 illustrates the type of voltage variation produced in the computing unit, the crossover points of which represent an ideal glidepath and course line.

Figure 29 shows in block diagram form certain circuitry of the computer unit illustrated in Figure 18B and is useful in illustrating the manner in which error tracking is accomplished, using a servo loop.

Figure 30 is useful in illustrating the time sequence of certain control signals and gates and echoes in relationship to the main bang or transmitted pulse in the range tracking unit.

In the AGCA system, the aforementioned antenna beam angle voltage varies from 2 volts to 52 volts in accordance with the angular position of the antenna beam being radiated, so that such voltage serves as a measure of the position of the radiated antenna beam.

The computing system in the AGCA arrangement, generally, contemplates the production of an alternating voltage from this antenna beam angle voltage combined with the aforementioned range voltage which is developed in the range tracking process, the intensity of such range voltage serving as a measure of the range of the aircraft from the situs of the radar equipment. In checking such combination the antenna beam angle voltage is first level shifted and simultaneously the range voltage is modified by applying the same to a non-linear circuit element such as thyrite, and the range voltage thus modified is combined with the level shifted antenna beam angle voltage, either azimuth or elevation as the case may be at that particular time.

The computing system for producing such combination of level shifted angle voltage and modified range voltage is illustrated essentially with reference to Figures 18A, 18B, which together constitute Figure 18. As a result of such combination alternating voltages are produced, the zero or cross-over points of which represent the locus of an ideal glidepath or course line, as the case may be.

The present invention is directed specifically to producing visually on a cathode ray tube an ideal glidepath and course line as determined by such cross-over points. However, before describing this feature in detail, the AGCA system is first described generally, since the means and techniques presented herein, involve rearrangement of the elements of the range tracking unit and the computer unit from that which they assume with respect to one and other in the normal AGCA function.

*Means shown in Figures 1–5 for producing information useful in producing visual indications and data for the range tracking and computing units in the AGCA function*

Figures 1, 2, 3, 4, 5:
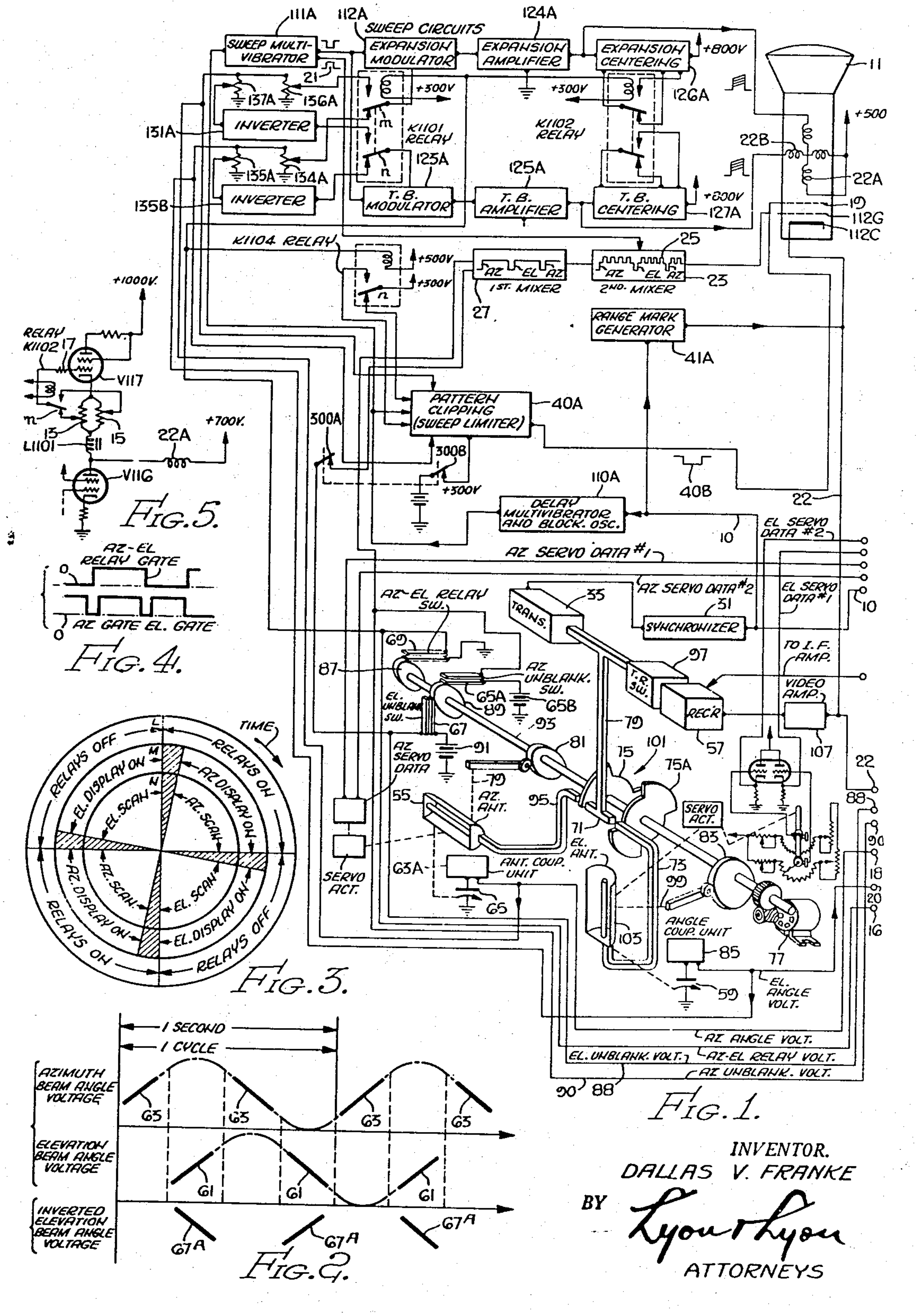
Figure 2 shows azimuth beam angle voltage, elevation beam angle voltage, as well as inverted elevation beam angle voltage, and their variations with respect to time as developed by the apparatus shown in Figure 1.
Figure 3 shows a cycle of operation of the radar scanning and indicating arrangements in Figure 1 and serves to illustrate the period during which the az.-el. relay voltage is available.
Figure 4 illustrates other voltages developed during cyclical operation of the apparatus illustrated in Figure 1.
Figure 5 illustrates more detail of the cathode beam centering means shown in block form in Figure 1, such circuitry being effective to shift the displays in Figure 6 sequentially from one origin position O–1 to the other origin position O–2 and from O–2 to O–1, etc.

The apparatus shown in Figure 1 is connected to the apparatus shown therein for producing visual indications on the face of a cathode ray tube 11 of the character shown in Figure 6.

In Figure 1, the synchronizer 31 serves to generate timing pulses which are used to time the application of pulses to the transmitter 33 to initiate its operation. The transmitter stage 33, pulsed at a constant repetition rate of, for example, 2000 or 5500 pulses per second, consists of, for example, a magnetron oscillator with a characteristic frequency of about 10,000 megacycles. The output of the transmitter stage 33 is transferred to either the elevation (el.) antenna 103 or the azimuth (az.) antenna 55, depending upon the position of the motor driven interrupter or radio frequency switch 101. The transmit-receive (TR) switch 97 prevents power from the transmitter 33 from being applied directly to the receiver 57. This transmit-receive switch 97, as is well known in the art, allows low intensity signals, such as a train of resulting echo signals received on the antennas 103, 55, to be transferred to the input terminals of the receiver 57. This deflection of energy from the transmitter 33 to the antennas 55, 103, accomplished by operation of switch 101, occurs at a rate of approximately two per second so that in effect the component antennas obtain four "looks" per second of the space scanned.

The resulting antenna beams are caused to move angularly i. e., to scan upon rotation of the shaft 93. The switch 101 is rotated twice per second, and while energy is being transmitted to one of the antennas 55, 103, the resulting electromagnetic beam projected into space is caused to scan such space. The means whereby such scanning movement of the projected electromagnetic beam is obtained may be of the type described in the copending application of Karl A. Allebach, Serial No. 49,910, filed September 18, 1948, now Patent No. 2,596,113, for bridge type precision antenna structure, which depends for its operation on the use of a variable wave guide type of antenna. This particular means, per se, forms no part of the present invention, and, so far as the aspects of the present invention are concerned, the antenna scanning beam may be produced by moving the entire antenna through a relatively small arc of a circle. Actually, in fact the azimuth antenna beam may scan first in one direction and then in the other, waiting after each scan while the elevation beam completes a scan in elevation. The azimuth antenna 55 scans a fixed horizontal angle of 20°, and is so placed as to include the approach course to a given airfield runway. Vertical scan of the elevation antenna 103 is from minus one degree to plus 6 degrees.

While in any position during the part of the cycle in which the relay frequency switch 101 allows the flow of energy into the elevation antenna 103, the elevation antenna beam is electrically scanned in elevation. The position of the elevation antenna beam is measured by means of a variable capacitor 59, one plate of which is attached to the beam scanner of elevation antenna 103 and varied in acordance therewith, such capacitor 59 comprising one part of a capacitive potentimeter and contained in the angle coupling unit 85 which may be of the type described and claimed in the copending patent application of Clarence V. Crane, Serial No. 212,114, filed February 21, 1951, now Patent No. 2,650,358. The angle coupling unit 85 thus used with capacitor 59 is useful in developing the elevation beam voltage represented as 61 in Figure 2.

Similarly, the angle in azimuth of the radiated azimuth antenna beam is measured by the angle capacitor 65 in the azimuth angle coupling unit 63A, operating synchronously with the scanner of the azimuth antenna 55. Such variation in azimuth angle voltage as a function of the particular angular position of the azimuth antenna beam is represented by cyclically varying voltage 63 shown in Figure 2. It is observed that these voltage variations 61 and 63 have portions thereof shown in heavy lines, and it is these portions which are used to effect control operations and which are selected by means mentioned later. Figure 2 also shows inverted azimuth elevation beam angle voltage as represented by the oblique lines 67.

Also coupled to the scanner of the elevation antenna 103 is the elevation unblanking switch 67, which has one of its terminals connected to the continuous voltage source 91 for purposes of developing an elevation unblanking voltage gate, shown in Figure 4, so timed that its positive value corresponds to the time of effective scanning of the elevation antenna beam. The azimuth unblanking switch 65A is similarly coupled to the scanner of azimuth antenna 55 with one of its terminals connected to the continuous voltage source 65B for purposes of developing azimuth unblanking voltage (Fig. 4) so timed that the positive portion of such voltage corresponds to the time of effective scanning of the azimuth antenna beam. Relay switch 69 operates at substantially the same time as switch 65A, and synchronously therewith, and serves to generate the so-called az.-el. relay voltage or gate (Fig. 4), which is so timed that its positive portion begins at a time just prior to the beginning of the azimuth unblanking voltage and just after the end of elevation unblanking voltage, and which ends at a time just after the ending of the azimuth unblanking voltage and just prior to the beginning of the elevation unblanking voltage, all as seen in Figure 4.

Figure 3 shows a schematic diagram of the time relations involved in a scanning action which, typically, occupies a time in the order of one second. Forward progress of time is represented by clockwise motion about this diagram. The central circular region of Figure 3 marked N shows the time schedule of the scanning operations of the two systems, opposite quadratures being scanned by the same system but carried out in opposite directions. The shaded areas (each comprising approximately 10 degrees of the complete 360 degree cycle) represent the periods during which the transmitter 33 is switched by the switch 101 in Figure 1 from one antenna to the other antenna. Unshaded areas of region N represent the time periods during which one or the other of the antennas is in use, sending out radio frequency pulses and received reflected echo signals from objects within the field of coverage of the beam. Shaded areas indicate inactive periods during which switching takes place, both antennas being momentarily isolated from the transmitter and receiver.

The inner annular region M of Figure 3 represents the time schedule of the related azimuth and elevation displays, subject however to pattern clipping described later, and corresponds to the cyclical variations of azimuth and elevation voltages represented in Figure 2.

The outer annular region of Figure 3, marked L, shows the time schedule of currents through the various coils of a number of so-called az.-el. switching relays for effecting time sharing. The relay actuating current is obtained by the switch 69 (Fig. 2) operating in synchronism with the mechanism producing azimuth antenna beam scanning.

More specifically, in Figure 1, the wave guide transmission line 79 leads from the transmitter 33 and receiving system 97, 57. A T-joint 71 divides this transmission line into two branches 73 and 95, leading through switch assembly 101 to the elevation and azimuth assemblies 103 and 55, respectively. These branches have suitably placed shutter slots which receive the rotating shutters 75 and 75A, respectively. These are mounted on the common drive shaft 93, driven by the motor 77, and have two blades each arranged in opposite fashion, so that when one antenna transmission branch is opened, the other will be blocked by its shutter. The shutter blades cover angles of approximately 100°, leaving openings of 80° as required by region N of Figure 3.

As mentioned previously, the same drive shaft 93 operates the two antenna beam scanning mechanisms represented by the dotted lines 99, 79, and assumed to be of the same construction as the above-mentioned Allebach application and built into the antenna assemblies. In the showing of Figure 1, the eccentric cams 83, 81 on shaft 93 operate the same scanning mechanism. Since each of the cams 83, 81 has one lobe, while its associated shutter 75A or 75 has two lobes, one opening in the shutter will find the antenna scanning in one direction, the other in the opposite direction. The azimuth and elevation unblanking switches 75A and 67 are shown schematically in Figure 1 as being cam actuated, being operated by the two-lobed cam 89, for purposes of establishing the unblanking or intensifying voltages represented in Figure 4.

The az.-el. relay switch 69 is operated by the cam 87 on shaft 93 to control current to the circuit switching relays, the junction of which is described hereinafter.

Radar echo signals, when received at the elevation antenna 103 or the azimuth antenna 55, as the case may be, are fed back into the switch 101 and passed through the TR switch 97 into the receiver 57. Receiver 57 serves to detect the video and after the video is amplified in the video amplifier stage 107, it is applied as so-called normal video to the correspondingly designated leads 22 in both Figures 2 and 7. Such video, i. e., radar video, derived from echo signals may be applied directly to the cathode of the cathode ray tube 11 shown in Figure 1 for purposes of producing visual indications; or, such normal video may first be "standardized" by applying the same to the video shaper indicated as such in the block diagram shown in Figure 7 and described in greater detail with respect to Figure 8. It is understood that other means may be used for applying the video to an intensity control electrode of a cathode ray tube and by, for example, the means and techniques described and claimed in the copending application of Landee et al., Serial No. 247,616, filed September 21, 1951, and assigned to the same assignee.

The cathode ray tube 11 in Figure 1 has a pair of magnetic deflection coils 22B, 22A, so arranged as to deflect the associated electronic beam substantially parallel to two mutually perpendicular axes, i. e., the so-called "time base" axis which is generally, although not exactly, horizontal as viewed by the operator, and the so-called "expansion" axis which is generally vertical. In general, each basic trigger pulse developed in synchronizer 31 (Fig. 2) is made to initiate a current wave of sawtooth form through the time base deflection coil 22B and a current wave of similar form through the associated expansion deflection coil 22A, the current in each coil expanding approximately linearly with time and then returning rapidly to zero. Instead of a linear variation, this variation may be logarithmic in character as described in the copending application of Homer G. Tasker, Serial No. 175,168, filed July 21, 1950, and assigned to the same assignee as the present application.

The resulting rate of such sawtoothed current is of course the same as, or a fractional multiple of, the pulse repetition rate of the transmitted radar pulses and occurs during the expectant period of resulting echo signals. It will be understood that electrostatic deflection of the cathode ray beam may be used instead of electromagnetic deflection, appropriate modification being made in other parts of the equipment.

Such sawthooth currents applied to the deflection coils 22B, 22A, however, are "modulated" at a much lower rate by currents of much lower periodicity which are produced by the aforementioned beam angle voltages shown in Figure 2. Those portions of the voltage indicated in heavy lines in Figure 2 only are used to modulate the voltages on a time sharing basis.

These voltages as represented by the curves 61, 63, may vary from plus 2 volts at one extreme of the scanning range to plus 52 volts at the other end. These particular antenna beam angle voltages as mentioned previously are used in effect to "modulate" an amplitude of the sawtooth voltage waves developed at the sweep amplifier shown in Figure 2 and applied at a much higher repetition rate to the expansion coil 22A, for purposes of obtaining so-called unidirectional or unidimensional magnitudes in the cathode ray display, in accordance with the principles set forth in the co-pending applicating of Homer G. Tasker, Serial No. 680,604, filed July 1, 1946, and assigned to the same assignee as the present application. On the other hand, the amplitude of the saw tooth voltage waves developed at the sweep amplifier and applied to the other quadraturely acting timing based coil 22B is likewise modulated to a much smaller degree and in a different manner, for purposes of orientation. Thus the amplitude of the currents applied to coil 22A is automatically varied in accordance with antenna beam angle voltage, so that the angle which any particular cathode ray beam makes, corresponds, on an expanded scale, to the antenna beam voltage.

The tube 11 is rendered fully operative for producing visible indications only when a suitable intensifying voltage is applied to its grid 112G, bringing the tube approximately to cut off condition. A relatively small additional video signal applied to the cathode 112C then strengthens the cathode beam, making it momentarily visible on the screen as a dot, the position of which is determined by the currents flowing at that particular moment in the set of deflection coils 22A, 22B.

For purposes of developing the aforementioned suitable deflecting currents in the cathode ray deflection coils 22A, 22B, the sweep generating circuit shown in Figure 1 is applied with basic triggers originating in the synchronizer 31 and applied to lead 10. Such trigger is applied to the delay multivibrator and blocking oscillator stage 110A, the output of which is fed to the sweep generating multivibrator stage 111A. A negative gating voltage is generated in the stage 111A and fed to the expansion and time base modulator stages 112A, 123A, respectively, and from them in modulated form through the expansion and time base amplifiers 124A, 125A. The output of the amplifiers 124A, 125A in the form of essentially trapezoidal waves of appropriate amplitude is applied to to the expansion deflection coil 22A and the time base deflection coil 22B, respectively, causing current pulses of substantially linear saw tooth form in the coils. Expansion and time base centering circuits 126A, 127A, are also connected to the deflection coils. The modulator stages 112A, 123A, for purposes of modulation, receive az.-el. antenna beam angle voltages via switches *m* and *n*, respectively, of relay K1101.

With the relay unactuated (as shown) the elevation beam angle voltage appearing on the potentiometer resistance 134A is applied through switch *m* to the expansion modulator 122A, and through potentiometer resistance 135A and inverter 135B and switch *n* to the time base modulator 123A. After completion of the elevation scan relay K1101 is energized through switch 69 breaking the elevation beam angle voltage connections just described, and connecting the azimuth beam angle voltage through potentiometer 136A and switch *m* to the expansion modulator 122A; and through potentiometer 137A, inverter 131A and switch *n* to the time base modulator 123A.

Thus the degree of modulation of sweep current, and hence the degree of angle expansion of the display shown in Figure 6 may be separately regulated for the azimuth display by adjustment of the potentiometer 134A, and for the elevation display by adjustment of the potentiometer 134A; and the degree of modulation of the time base sweep current, and hence the apparent angle between the range marks and the time base may be separately regulated for the azimuth display by adjustment of potentiometer 137A, and for the elevation display by adjustment of the potentiometer 135A.

The centering circuits 126A, 127A in Figure 1 are individually capable of two separate adjustments, one effective when relay K1102 is actuated (azimuth display) and one when the relay is unactuated (elevation display) to determine the position of the points $O_2$, $O_1$, respectively, in Figure 6. Thus the origins of azimuth and elevation displays are separately adjustable, the centering circuits automatically responding to one or the other set of adjustments according to the energizing condition of relay K1102. A schematic diagram showing a centering circuit for this purpose is shown in Figure 5.

The deflection coil 22A in Figure 5 is connected between a 700 volt positive supply and two parallel circuits, one leading to ground through tube V–1116, which is the final stage of expansion amplifier and the other returning through choke coil L1101 and centering tube V–1117 to a 1,000 volt positive supply. The first of these two circuits feeds to deflection coil 22A, the periodically varying sweep producing component, while the second circuit provides a relatively constant but adjustable centering current component. The cathode resistor of centering tube V–1117 is made up of two parallel connected potentiometers 13 and 15, the movable contacts of which are connected respectively to the normally closed and normally open contacts of switch *m* of relay K1102. A switch arm is connected through grid resistor 17 to the tube grid. The grid bias, and hence the centering current through the tube and through the coil 22A thus depends upon the position of relay switch *m* and is determined by the setting of the potentiometer 15 when relay K1102 is actuated (azimuth display) and by the potentiometer 13 when the relay is not actuated (elevation display). The two displays are therefore separately adjustable on the indicator tube by means of the two potentiometers.

The time base deflection coil 22B is provided with centering circuit which is identical to that in Figure 5 and functions in a like manner, controlled by switch *n* of relay K1102. In fact, by appropriate changes of the numerals and lettering Figure 5 may be considered to illustrate the time base centering circuit. The potentiometer then provide separately adjusted ordinary elevation and azimuth displays with respect to the horizontal positions.

It is noted that the preferred inter-relationship of the two displays in Figure 6 is such that the series of corresponding range marks of the two patterns lie in a straight line so that the two aircraft images 38A, 39A always lie in a line just parallel to the range mark lines, one directly above the other.

The azimuth and elevation displays shown in Figure 6 are limited so that they appear as shown, such pattern clipping or limiting being produced by operation of the pattern clipper or limiter 40A shown in Figure 1. Such sweep limiter 40A forms, per se, no part of the present invention and may be the one described and claimed in the copending patent application of Raymond B. Tasker, Serial No. 212,163, filed February 21, 1951, and assigned to the same assignee, now Patent No. 2,663,868. In general, the output of sweep limiter stage 40A is a negative-going gating voltage 40B applied to the first anode 19 of the cathode ray tube 11. Such negative-going gating voltage 40B is used for darkening, i. e., blanking out, the indications which may be otherwise visible. Such blanking occurs during undesired periods of sweep as now described specifically.

The azimuth display, which is preferably the lower one, is blanked or clipped or limited, above a horizontal line LM which extends parallel to the runway axis 150A and at a sufficient distance above it to allow for expected errors in the azimuth angle of approaching aircraft. In the elevation (upper) display, a section is cut out or clipped, such section being below the horizontal runway axis $O_1G$ and to the right of a short generally vertical line KJ. This line KJ is located just to the left of and parallel to the upper limiting sweep path $O_2L$ of the lower azimuth display. The region thus eliminated from the elevation display corresponds to space below the runway level.

Besides serving to produce this desired clipping in the visual display, the negative-going gating voltage 40B developed in the limiter stage 40A is useful in the automatic tracking system shown in block form in Figure 7 for limiting the time during which video is available in such automatic system. For that purpose gating voltage 40B is applied as shown therein to the "Video Shaper" for purposes of limiting the time during which standardized video is produced in the manner described hereinafter.

As shown in Figures 1 and 7 the input to the sweep limiter 40A is: (1) a trigger derived from the basic trigger appearing on lead 10; (2) the azimuth and elevation angle coupling voltages on leads 18 and 20 respectively; and (3) the az.-el. relay voltage on lead 16. It is understood that this negative gating voltage 40B appears at variable times along the time axis depending upon the magnitude of either the azimuth or elevation beam angle voltage, whichever one at that particular time is effective.

The purposes of the switches 300A, 300B shown in Figure 1 are fully described in the above mentioned application of Homer G. Tasker and for the present instance may be considered to remain closed.

It is observed further in connection with Figure 1 that the sweep multivibrator 111A generates a positive-going gating voltage 21 of a duration substantially equal to the time duration of the cathode beam sweep and such positive-going gating voltage is applied to the second mixer stage 23 to produce the wave form 25. This wave 25 comprises pulses of sweep frequency added to the longer azimuth and elevation gates which are developed in the first mixer stage 27 and shown also in Figure 4. This composite wave 25 is applied to the cathode ray grid 112G, bringing the tube up to the point of cutoff during each sweep. By this expedient the cathode ray tube is conditioned for producing visual indication only during those times when video signals are being expected.

The range marks 40, 41, 43, 45, 47, and 49, shown in

Figure 6, are developed by the range mark generator 41A (Fig. 1) in accordance with basic triggers applied to such stage from lead 10. The range marks developed in stage 41A are applied to the cathode 112C.

It is observed that the display shown in Figure 6 includes sectors defined by the so-called V-follower lines 50A, 51A and 52A, 53A, which sectors are developed using the apparatus connected to the leads in Figure 1 marked Az. Servo Data No. 1, Az. Servo Data No. 2, and El. Servo Data No. 1 and El. Servo Data No. 2, all in accordance with the teachings in the above mentioned application of Landee et al., Serial No. 247,616, filed September 21, 1951.

Also Figure 6 shows the glidepath course line 149A and runway course line 150A. These two course lines may be developed electronically by apparatus described and claimed in the copending application of Raymond B. Tasker and Burton Cutler, Serial No. 222,512, filed April 23, 1951, and assigned to the same assignee; or, preferable, these lines are obtained using the cursor generator illustrated in Figures 24 and 25 herein.

*Purpose and functions of apparatus*

The apparatus described herein combines the functions of:

1. Aircraft acquisition
2. Automatic tracking
3. Error computation and control signal transmission.

The controlled aircraft is equipped with suitable radio equipment and an autopilot with automatic approach coupler. This equipment may be used as an automatic ground controlled approach system (AGCA) for the simultaneous guidance of two or more aircraft during their approach to a given runway adjacent to which radar equipment is located for scanning the approach zone.

The radar system incorporates two antennas, one for scanning the approach zone in a vertical plane, and the other antenna scans the same approach zone in a horizontal plane. Vertical scan is from minus 1° to 6° while horizontal scan is in the order of 20°. In a system of this character, an approaching aircraft is first located by conventional search radar, using for example, a plan position indicator (PPI) and is then directed by radio communication to the correct position for entry into a predetermined ideal glidepath (vertical plane) and course line (horizontal plane). The final approach along such ideal glidepath and course line is indicated upon the face of a cathode ray tube and the actual course of the aircraft is visually compared with that of an ideal approach, such ideal approach, i. e., ideal glidepath and ideal course line being developed electronically by a so-called cursor generator.

In prior art systems of this character, radio communication is used to direct the aircraft along such ideal glidepaths and course lines, but in accordance with the present invention, means are provided for developing and transmitting to the aircraft, control signals which are representative of the deviation of the aircraft from such glidepath and course line for purposes of maintaining, or tending to maintain, the flight of such aircraft along such glidepath and course line.

For accomplishing such automatic control of aircraft, the AGCA system described herein is such as to receive information from conventional GCA radar equipment relative to the range azimuth and elevation positions of the approaching aircraft and to compare these positions with an ideal predetermined glidepath. The result of this comparison, in the form of error signals, is electronically computed and automatically sent to the controlled aircraft via very high frequency radio communication. AGCA airborne equipment receives this information (correction signals) and interprets it in the form of control voltages, which are applied to the aircraft's autopilot approach coupler.

The range of this automatically controlled approach is from approximately eight miles from the given landing field to a point of release from the system, known as touchdown. This point of release, or touchdown, is at an altitude of approximately fifty feet above the given landing strip; and at such a position of altitude that the pilot may assume control for the actual landing operation during the last few seconds of the landing.

Prior to the establishment of flight control of an approaching aircraft, communication between the AGCA installation and pilot of the incoming plane, may be effected via a conventional transmitter receiving system in the VHF band in the region of 240 megacycles.

Briefly, in operation of the AGCA system, the search radar operator, using the display of the conventional search radar (PPI) tracks the aircraft to a proper position altitude of the AGCA final approach. The entry into the AGCA system is along an "on course" approach line at a distance of approximately ten miles and at an elevation of approximately 2800 feet above the the air field.

In the meantime, the radar equipment, being energized, is in its "search" function or condition in which a slow search sweep voltage is periodically developed for searching a radar echo from the approaching aircraft. As a matter of fact, coincidence of a radar echo from such aircraft with such slow search sweep voltage notifies the system of an approaching aircraft; and thereupon the tracking unit, illustrated in Figure 13, automatically switches from such "search" function or condition to a "track" condition and displays the range and speed of the incoming aircraft. Simultaneously, upon switching from such search to track function, the AGCA transmitter is turned "on" and a subcarrier on a transmitted wave, containing a so-called "channel select" key, is transmitted to the approaching aircraft. At a given range, or upon directions from the ground via conventional radio transmission, the pilot of the approaching aircraft renders effective his airborne decoder (signal data converter) by actuating a switch.

Actuation of such switch starts the search drive motor of the airborne decoder, and the output of the AGCA airborne receiver is searched for an AGCA subcarrier. At intervals of 25 seconds, the AGCA ground transmitter is automatically interrupted for a one-second period. This interruption constitutes "interrogation."

If upon the "interrogation" the airborne decoder has located the transmitted subcarrier, the signal interruption causes the detector to send a 4500 cycle per second "confirmation" signal to the ground via the airborne transmitter. This "confirmation" signal is received by the AGCA receiver and serves to energize relay windings to apply a +28 volt so-called "control" signal to a common bus of the ground equipment.

At the time the range tracking unit in Figure 13 automatically switches from its "search" function to its "track" function as described above, a so-called tracking "on" signal developed in the range tracking unit is applied to the computer unit illustrated in Figures 18A and 18B, so that a computer unit is conditioned to compute the error, if any, of the aircraft from the ideal glidepath and ideal course line.

Upon development of the confirmation "control" signal resulting from "confirmation" the AGCA transmitter is turned on to transmit to the aircraft the error signals computed by the unit shown in Figures 18A and 18B, as well as certain other information. Such error signals, i. e., azimuth and elevation control signals, as well as a signal representative of the instantaneous range of the aircraft, is used to modulate the sub-carrier transmitted to the aircraft, to provide the autopilot with correction signals for "on" course approach and providing the pilot with visual display instantaneous range from touchdown information.

The data, including control signals for effecting flight of the aircraft as well as other control signals, are transmitted from the ground to the aircraft by the use of a sub-carrier on the transmitted wave.

The AGCA system as developed includes a frequency spectrum which encompasses a carrier width sufficient for the control of six aircraft simultaneously. For this purpose, the AGCA carrier wave, transmitted in the region of 109 megacycles, includes a 30 cycle reference tone, a 3800 cycle voice band, and six positions for sub-carriers, equally spaced from 5 to 15 kilocycles upon the basic carrier, there being one sub-carrier for each of the six aircraft. This condition is represented in Figure 39 which illustrates the side bands on one side of the carrier wave only.

The 30 cycle reference tone originates in the AGCA transmitter mixer, and is used as a reference signal by an airborne decoder entering AGCA control. Such reference tone serves as a comparison for a 30 cycle phase shifted tone, included in all of the sub-carriers.

The voice band from 300 cycles to approximately 3800 cycles is included upon the basic carrier. This band is used to pass frequencies over the AGCA semi-private voice line upon the establishment of control, i. e., confirmation to the ground by the aircraft. Through a holding relay in the AGCA coder described hereinafter, voice communication between the ground installation and the aircraft's pilot is automatically available for a period of one minute after a "wave off" signal (release of ground control) is transmitted from the ground; or, communication may be held for an indefinite period by the ground operator by the actuation of a control switch.

The six sub-carriers, equally spaced, may be included in the modulation of the basic carrier at frequencies from 5 to 15 kilocycles above and below the basic carrier frequency. In general, the AGCA coder circuitry illustrated in Figure 41 serves to modulate a particular AGCA channel sub-carrier with control functions of azimuth error, elevation error and other functions enumerated below. This unit includes a sub-carrier oscillator, which develops the sub-carrier used in the particular control channel. The output of the oscillator is modulated by a square wave, generated within the coder unit, and the shifting of the frequency, amplitude, type, and symmetry of this modulation is indicated in Figure 40.

The control functions modulating each sub-carrier and the methods of modulation are as follows:

1. Azimuth control of the aircraft is effected by frequency modulating the 30 cycle phase shifted signal included on the particular sub-carrier.

2. Elevation control is obtained by using amplitude modulation by variation in symmetry of a square wave as indicated in Figure 40.

3. The pilot of the aircraft is provided with information as to his range from touchdown, using amplitude modulation by varying the frequency of the square wave as indicated in Figure 40.

4. A relay in the aircraft may be controlled from the ground for purposes of effecting voice communication and for that purpose amplitude modulation using 30% modulation by the square wave is employed.

5. So-called "channel selection" is provided using 70% amplitude modulation by the square wave.

6. Warning signals are transmitted to an approaching aircraft when his spacing to a preceding plane is below a predetermined minimum spacing and for that purpose, frequency modulation using variable deviation of the 30 cycle signal on the sub-carrier is employed, in such case a deviation of 180 cycles constitutes a warning signal.

7. Also a "wave off" signal may be transmitted to the aircraft, the wave off being effected upon absence of 30 cycle modulation of the sub-carrier.

The AGCA system uses standardized video, i. e., the radar echo signals are shaped by measuring incoming radar echoes and utilizing all signals above a predetermined level to produce standardized pulses, such standardized pulses being of equal width and amplitude to assure consistent tracking performance.

Inasmuch as the antenna beams, i. e., the azimuth antenna and the elevation antenna beams scan through space on a time sharing basis, there are intervals during the scanning periods when thereis no video. Moreover during one antenna scanning cycle radar hits, i. e., echo signals may be derived from a plurality of aircraft in the approach zone, some of the aircraft being larger than others and of course at different ranges from touchdown.

In view of these considerations, the AGCA system is provided with so-called range gated automatic gain control in the radar receiver, so as to maintain the gain of the receiver at a substantially constant level during scanning cycles.

For this purpose, the circuitry of the range gated automatic gain control measures the amplitude of radar echoes reaching the ground based equipment and controls the gain of the intermediate frequency amplifier in the superheterodyne type radar receiver, in an inverse relationship. This circuitry includes adjustable "memory" and "learning" characteristics whereby the intermediate frequency gain control is partially dependent upon "remembered" input and whereby the rate of response to new input amplitudes may be varied.

The AGCA system incorporates certain safety features, one of such features being termed "control with warning," and results when the separation between any two tracked aircraft falls below a minimum preset value. This "control with warning" signal may be observed visually by warning lights at the ground equipment, and is also transmitted to the pilot of the overtaking aircraft. This "control with warning" signal is derived in the so-called overtake warning and wave off unit, illustrated in Figures 29 and 30, from data supplied thereto from two range tracking units of the type illustrated in Figure 13.

A second safety feature involves so-called error wave off which is initiated through the failure of an aircraft to respond to AGCA control signals and the circuitry for this is illustrated in connection with Figures 18A and 18B.

A third safety feature which is related to the first mentioned safety feature involves an excessive overtake condition. When an approaching aircraft overtakes a preceding aircraft by more than a pre-established distance, an error wave off signal, derived by the circuitry illustrated in Figures 29 and 30 is transmitted to the aircraft to release the autopilot from AGCA control and effects the transmission of a maximum "fly up" signal to the aircraft.

The aforementioned wave off signals should not be confused with the normal wave off signal transmitted to the aircraft. In a normal approach an automatic wave off signal is transmitted to the aircraft indicating the return of flight control to the pilot for the final landing operation. One minute after the transmission of such normal wave off signal the particular control channel which causes tracking of the aircraft automatically returns to a standby condition so that it may automatically re-enter AGCA channel sequence cyclically.

It should be noted that a complete AGCA system includes, for each aircraft to be tracked in the approach zone, the following components: a range tracking unit of the character illustrated in Figure 13, a computer unit of the character illustrated in Figures 18A, 18B, a coder and sequencing unit of the character illustrated in Figure 41 with auxiliary equipment. These enumerated elements constitute a so-called control channel and means are provided in the AGCA system for placing each channel in the following conditions to perform the designated functions. These conditions and functions are:

1. Standby
2. Search
3. Track
4. Control
5. Control with warning
6. Wave off

Means are provided for automatically sequencing the operation of a plurality of control channels; thus, assuming two control channels, i. e., Channel No. 1 and Channel No. 2, upon actuation the AGCA equipment in Channel No. 1 automatically goes into a "search" condition, while the equipment in Channel No. 2 remains in a "standby" condition. Channel No. 1 thus awaits the incidence of an aircraft radar echo within the glidepath approach area. The incidence of such an echo causes the equipment of Channel No. 1 to automatically change from the search condition to the track condition and also institutes a ground air data link; the equipment in Channel No. 2 still remains in a standby condition.

Means are provided herein for preventing the equipment in both Channels No. 1 and No. 2 from tracking the same aircraft, although the equipment in Channels No. 1 and No. 2 may both simultaneously "control" different aircraft. While tracking aircraft in the tracked condition, the particular channel has means for displaying the instantaneous range and speed of the aircraft being tracked by that channel and transmits signals of interrogation to the aircraft.

Confirmation of the ground air data transmission link by the incoming aircraft, causes the equipment in Channel No. 1 to change from the "track" to the "control" function. Upon switching to the control function, correction signals are sent to the aircraft, and, simultaneously, the equipment in Channel No. 2 is automatically switched from its "standby" condition to its "search" condition, awaiting the incidence of echoes from a second aircraft within the approach zone. After incidence of such echo the equipment in Channel No. 2 automatically goes into its track condition and later, after confirmation, goes into control condition or function.

Thereafter the equipment in Channel No. 2 may go into its "control with warning" condition or function should the aircraft which it is tracking approach too closely the aircraft tracked by Channel No. 1; and, should the pilot of the approaching aircraft fail to heed the warning and slow up the speed of his aircraft to prevent the approaching aircraft from falling within a predetermined minimum spacing, then the equipment in Channel No. 2 automatically goes into a "wave off" condition or function, and transmits a maximum fly up signal to the approaching aircraft. Other wave off signals may be transmitted by either Channels No. 1 or No. 2, depending either on whether or not the particular aircraft being tracked responds to control signals; and, a normal wave off signal is transmitted by Channels No. 1 and No. 2 successively as the aircraft which they correspondingly tracked reaches the touchdown point.

In general, the range tracking unit illustrated in Figure 13 performs the functions of aircraft acquisition and aircraft range tracking, and displays the instantaneous speed and range of the tracked aircraft. In addition, this unit produces a tracking on signal at the time the unit is switched from a search condition to its track condition. Also developed in the tracking unit is a so-called video on signal of the character illustrated in Figure 20 for "notifying" elements in the computer unit illustrated in Figures 18A, 18B of the time at which video is present. Further, the tracking unit develops a "3-mile pick off" signal when the tracked aircraft is within three miles of touchdown so as to render effective the operation of the excessive error wave off circuitry in the computer unit, Figures 18A, 18B.

The operation of the range tracking channel is such that when it is in a search condition radar echoes entering the tracking unit as standardized video are compared with a variable delay gate controlled by the one-tenth cycle per second sawtooth wave illustrated in Figure 11 and developed by the circuitry shown in Figure 10.

Coincidence of the delay of the range gate with the delay of video representing an aircraft causes the tracking unit to send the confirmation "tracking on" signal to the AGCA coder and the AGCA computer. Tracking of the incoming aircraft in range commences at this point and consists of constantly revising the range of the tracking gate so that it continues to encompass the approaching aircraft.

Range voltage proportionate to the delay of the tracking gate in relationship to the system trigger is displayed and applied to other portions of the circuitry. The differentiation of range voltage with respect to time produces a "speed voltage" which is also displayed.

During the "search" condition, the range gate of the tracking unit has a width of approximately 2.2 microseconds. Confirmation of ground control by incoming aircraft applies a control "on" signal to the tracking unit to cause such unit to automatically switch from its track function to its control function and to simultaneously cause the tracking gate to be narrowed to approximately 2.2 microseconds.

During periods of "control" the range tracking unit passes range information to the AGCA computer (Figures 18A, 18B) and, in addition, a "video on" signal which notifies the computer of the time at which video is present. During the control condition the area in which the tracking unit may track video is limited by an angle gate originating in the computer (Figures 18A, 18B).

The angle gate generator circuitry for this purpose, in Figures 18A, 18B, limits the region as indicated in Figure 20, within which the range tracking unit may respond to radar echoes to an area closely surrounding the tracked target. This angle gate circuitry is not operative during the "search" condition, but is rendered effective upon development of the tracking on signal, i. e., upon switching of the unit from the search condition to the track condition.

The AGCA system includes an overtake warning and wave off unit illustrated in conection with Figures 29 and 30, such unit being common to a plurality of channels of automatic flight control and providing two of the aforementioned safety features.

The tracking unit of each control channel, i. e., the aforementioned Channels No. 1 and No. 2, generates a range gate the time delay of which is directly proportionate to the instantaneous range of a tracked aircraft. This range gate is applied to the proper individual channel in the overtake warning and wave off unit, which creates a so-called "safety gate" of manually variable width, immediately following the tracked aircraft.

The safety gates following each tracked aircraft are applied to a common bus, which is constantly monitored by a coincidence detector. Coincidence of the range gate of one tracked aircraft with that of another triggers a sawtooth generator circuitry whose output is measured for control purposes. The degree of "overtake," expressed as an output voltage for each channel, is measured by two relay control circuits. The existence of an overtake condition results in closing of a so-called overtake relay, which provides suitable warnings from a common bus. Greater degrees of overtake actuate the so-called wave off relay, to cause the transmission of wave off signals to the aircraft.

In accordance with features of the instant invention, the AGCA system incorporates means shown in Figures 18A, 18B for generating an alternating voltage representing at the zero voltage crossover points an "ideal" glidepath and "ideal" course line, which are so adjusted to coincide with an actual physical ideal approach to a given airfield. This glidepath and course line thus generated for the primary purpose of developing control signals for controlling the flight of an aircraft both in elevation and in azimuth, may be checked visually on the face of a cathode ray tube upon rearrangement of the circuitry used in accomplishing the primary function of developing control signals.

Also the AGCA system includes a so-called artificial aircraft unit as auxiliary equipment primarily useful for alignment purposes. In general, the artificial aircraft unit functions so that an electronically produced "artificial aircraft" may be manually shifted in "elevation" and "azimuth" angular position, may be caused to pursue a rapid return in "range," and may be caused to "fly" either backward or forward. When used for alignment purposes, the artificial aircraft is inserted as a portion of a servo alignment loop in which a channel of automatically controlled flight tracks and controls the original aircraft. Control signals from the computer are integrated and used to control the elevation and azimuth positions of the artificial plane. Correction signals, computed by the ground equipment, may be compared with the visual position relationship of the artificial aircraft and the displayed ideal glidepath for alignment purposes.

Further, the AGCA system includes so-called "clutter" gating circuitry, illustrated in connection with Figures 26, 27 and 28 for developing gates adjustable in width and adjustable in range in the aircraft approach area. This clutter gating circuitry supplies a control signal to the computer, illustrated in Figures 18A, 18B, when a tracked aircraft is within the limits of these adjustable gates, i. e., within a clutter area, such control signal serving to attenuate computed error signals within the gated areas.

*Brief description of range and angle tracking circuits with respect to Figures 26, 27, 28, 29 and 30*

In ascertaining the position of an aircraft with respect to a predetermined glidepath, certain concepts are embodied herein which are exemplified in connection with Figures 26 and 27. In this respect, Figure 26 illustrates a theoretical approach to the solution of this problem, while Figure 27 represents the circuitry as actually described in detail herein, the arrangement in Figure 27 being preferred particularly since it conveniently allows the development of an angle gate.

In Figure 26, range tracking of the aircraft is obtained using circuitry in the range tracking unit 1700, such unit 1700 being supplied with radar video, i. e., echoes and triggering pulses which are developed in timed relationship with respect to the transmission of pulsed energy to the aircraft; and such unit 1700 develops a voltage on lead 1701 representative of the range of the aircraft as well as a so-called stretched video signal on lead 1702, such stretched video signal being transmitted to the angle tracking circuit 1703 so as to render such unit 1703 sensitive or effective only during the period of such stretched video, i. e., the time during which radar echoes are being received. This stretched video developed on lead 1702 is compared, in time, with the antenna beam angle voltage supplied over lead 1705 to the angle tracking unit 1703; and a result of the comparison of the stretched video signal with the angle voltage, a voltage is developed on lead 1707 representative of the actual position of the aircraft or plane. This voltage on lead 1707 representative of the actual position of the aircraft, is compared with a second voltage developed in the reference generator 1708, such second voltage being applied to lead 1709, and being representative of the position of an aircraft flying "on course" along a predetermined glidepath or course line, as the case may be.

These two voltages developed on lead 1707 and 1709 are compared in a differential network including resistances 1710 and 1712, so as to develop a different voltage on 1713, such different voltage constituting the so-called error voltage and representing the deviation of the tracked aircraft from such predetermined glidepath or course line.

For this aforementioned purpose, the stretched video on lead 1702 serves to gate the angle tracking circuit 1703, so that angle voltage appears on lead 1707 only during the reception period of echoes.

Inasmuch as the radar equipment is located adjacent the aircraft landing field and not at touchdown, certain corrections are required in accordance with principles described in connection with Figure 21, such correction being supplied by the reference generator stage 1708, which may be considered to generate stage an ideal angle voltage in accordance with the particular value of range voltage appearing on lead 1701.

The error voltage developed on lead 1713 serves to modulate a transmitter for transmitting correction signals to the aircraft.

In the arrangement shown in Figure 27 which is more representative of the actual circuitry described herein, the range tracking unit 1700 supplied with video and system triggers develops on lead 1701 a voltage representative of the range of the aircraft and develops on lead 1702 a stretched video signal of the character illustrated in Figure 20. The range voltage is supplied to the reference generator 1720 which feeds a voltage to the so-called course computer unit 1722 to which is supplied also either azimuth or elevation antenna beam angle voltage, as the case may be at that particular instant.

The course computer 1722 serves to develop a predetermined glidepath or course line as the case may be, such glidepath or course line being determined by the crossover points (indicated by "x" marks), of an alternating voltage of the character represented in Figure 28. A line passing through these "x" marks in Figure 28 establishes a socalled "on course" line. The alternating voltage of the character listed in Figure 28 appears on lead 1724 in both Figures 27 and 29 and is applied to an angle tracking unit 1726 for purposes of developing an error voltage on the output lead 1728, which is representative of the deviation of the aircraft from its "on course" position.

The angle tracking circuit 1726 is gated to receive incoming information only during the period of the stretched video gate transferred over lead 1702. The angle tracking unit described in detail herein and represented in block diagram form as unit 1726 in Figure 27, is illustrated in Figure 29.

The angle tracking circuit constitutes a servo loop in which a unidirectional feedback voltage developed on lead 1728 serves as an indication of the deviation of the tracked aircraft from the predetermined glidepath or course line. The error voltage developed on lead 1728 is used to modulate a transmitter for transmitting correction signals, so that the aircraft is caused to fly, or tends to fly, along such predetermined glidepath or course line.

In this respect, while the angle tracking unit as such constitutes a servo loop, such servo loop forms a part of a second servo loop, such second servo loop as illustrated in connection with either Figures 16 or 17 constitutes the angle tracking unit supplying information to the aircraft via the ground-to-air data link, the radar link between the aircraft and the radar installation, and the radar installation in turn, supplying information to the angle tracking unit.

Returning to the servo loop illustrated in Figure 29, the alternating voltage of the character illustrated in Figure 28 is sampled at the time of the stretched video on signal developed on lead 1702. In general, at coincidence of the stretched video on signal with a crossover point of the alternating voltage illustrated in Figure 28, a zero error voltage is developed on lead 1728 indicating that the aircraft is flying on course; if, at the time of the stretched video on signal the aircraft is flying to the right of the on course line, a positive voltage is developed on lead 1728; and if, at the time of the stretched video signal the aircraft is flying to the left of the on course line, a negative voltage is developed on lead 1728.

The angle tracking unit illustrated in Figure 29 constitutes a closed electronic servo loop with a unique configuration of samplers and integrators, in which a step function 1730 is developed at the time of each crossover point in Figure 28. This step function 1730 supplied through the limited amplifier 1732 to the sampler 1733 is compared with the stretched video supplied to such sampler 1733. The stretched video signal gates the sampler 1733 so as to cause admission of a positive charge to the first integrator stage 1734 during the time that the video occurs on the high side of the step and a negative charge during the time that video occurs on the low side of the step.

The first integrator stage 1734 integrates the areas under the positive and negative portions of the video envelope, and if any asymmetry exists, the output of the integrator stage 1734 is other than zero, i. e., either positive or negative, causing the second integrator stage 1734 to act in such a way as to center the step 1730 on the stretched video signal or envelope.

The use of double integration provided by stages 1734 and 1735 results in velocity memory in angle tracking, since the output of the first integrator 1735, 1734 is a voltage representing the angular position of the aircraft, and in the absence of video signals, this voltage does not change.

Another important feature of the angle error tracking circuitry illustrated in Fig. 29 is that the vertical line of the step function 1730 is automatically centered with respect to the stretched video envelope thereby assuring weighing of all radar hits which constitute the stretched video envelope, it being remembered that the stretched video envelope is of the character illustrated in Figure 20. By thus giving weight to all radar hits, the effective center of the aircraft is established with respect to the predetermined glidepath or course line.

For purposes of assuring range tracking of aircraft appearing on or immediately adjacent the position of the tracked aircraft, the video supplied to the range tracking unit 1700 (Figure 27) is angle gated, i. e., such video is allowed to have its effect on the range tracking unit 1700 only during a relatively short interval when radar hits are being expected from an aircraft being tracked.

For that purpose an angle gate generator 1740 (Figure 27) is provided for developing angle gates substantially at the time the antenna beam crosses the aircraft. The angle gate formed by the generator 1740 in Figure 27 is represented at 1743 in Figure 30 in relationship to other signals and control voltages developed in the system.

In Figure 30, pulses corresponding to the periodic transmission of energy are represented at 1745 as "main bangs." The resulting video echoes of an aircraft flying on or adjacent to the on course line are represented at 1746. A reference delay voltage 1747 is developed in the range tracking unit 1700, by means described in detail elsewhere herein, for tracking such video signal 1746, i. e., for producing range tracking.

As a result of coincidence between the video echo 1746 and delay voltage 1747, the bipolar early and late gates 1748 and 1749 respectively are developed in the range tracking unit 1700. The positive portions of the gates 1748, 1749, are effectively added to produce the range gate 1750.

The range gate 1750 is used for producing different control effects in the system as described herein. One safety feature of the present system resides in the fact that it will not supply correction signal to the aircraft being tracked unless the video signal 1746 falls within the range gate 1750 and angle gate 1743 simultaneously.

*Ground rate and air rate systems shown in Figures 16 and 17*

Two simplified block diagrams of the AGCA system are presented in Figures 16 and 17. Figure 16 shows a system using "ground rate" while Figure 17 shows a system using "air rate." These two systems are provided by suitable switching to adapt the system for controlling aircraft having different autopilots.

Precision radar equipment 700 shown in Figure 1 scanning the approach area provides the AGCA equipment with the azimuth and elevation angular scanning data and video targets within the limits of the region scanned. The radar equipment also supplies a system trigger to the AGCA equipment.

Range tracking is accomplished by the AGCA tracking unit 701, shown in Figures 12 and 13, which constantly revises the delay of a range rate in such a manner that it encompasses the video envelope of a tracked aircraft. Tracking results in the generation of a range voltage ($\varphi$) directly proportional to the delay, or range, of the radar target echo with relation to the touchdown point.

A second output of the range tracking unit 701 is stretched video shown in Figure 20, a gate of fixed amplitude, enduring for the time required for the radar scan to cross the tracked target, plus a fixed period of 500 microseconds. The extension of stretched video throughout the AGCA system is known as the "video on" signal.

With respect to the reference computer 702, details of which are shown in Figure 18A, assuming that for the small angles scanned in the AGCA approach area the value to the sine of the angle is approximately equal to the angle expressed in radians, it may be shown that, assuming a touchdown angular position voltage as a reference of zero volts, the correct position angle voltage for any range is found by the general equation $E_r=K(1-1/n)$, where K is an arbitrary constant and $n$ is a factor expressing the range of the aircraft from touchdown divided by the range from the equipment to touchdown. The function, therefore, of the reference computer, is the translation of the range voltage ($\varphi$) to a reference voltage, $f$(R), which, when added to a suitably shifted azimuth or elevation angle voltage, as the case may be, will result in a voltage of zero when the antenna is at the angle equal to the corresponding azimuth or elevation position of an aircraft "on course" for any given range (zero to ten miles). The input to the reference computer, therefore, is the range voltage ($\varphi$) generated in the tracking unit. The output of the reference computer is a general function of this input, following the equation $f(R)=K(1-1/n)$.

The function of the course computer 703, details of which are shown in Figure 18A, is the inversion of elevation angle voltage, and the addition of level shifted elevation and azimuth angle voltages to the reference voltage. The output of the course computer is a pair of composite angle and reference signals whose value at the instant that the "video on" signal occurs denotes the error of the tracked aircraft from course or glidepath, i. e., error in azimuth or elevation, as the case may be. One of this pair of signals, i. e., the azimuth signal, appears on lead 704 while the other signal, i. e., the elevation signal, appears on lead 705. These signals on leads 704, 705 are ninety degrees out of phase and vary cyclically at approximately 2 cycles per second.

The azimuth and elevation angle tracking circuits 707, 708 respectively each incorporate a substantially identical closed servo loop which is shown in detail in Figure 18A and which is arranged in such a way as to measure the amount by which the input signal deviates from zero at the time of the video on signal supplied thereto over leads 709, 710 respectively. As explained more fully elsewhere, this constitutes a measure of the angular deviation of the aircraft from a predetermined course or glidepath. In the azimuth tracking circuit 707, the position error determined by the loop is compared with the composite output of the course computer at the time for the video on signal. If the values are equal, the video on signal is bisected by a step voltage and no loop error exists. Hence the course error of the aircraft has been correctly found. If the step voltage does not bisect the video on signal, a loop error is sensed, which, acting upon the integrators, causes the error voltage output to change in such a manner as to make the step bisect the video on signal and make the output correctly describe the error of the plane from course. The output of the tracking circuits 707, 708 appears on leads 712, 713 respectively as continuous voltages representing the position errors of the tracked aircraft in azimuth and elevation respectively.

Both azimuth and elevation control signals appearing on leads 712, 713 are modulated by "course softening" stage 715 (details of which are shown in Figure 18B) in which control signals are modified by the range voltage in such a manner as to decrease the sensitivity of the system to flight errors as the controlled aircraft approaches touchdown. Course softened elevation control signals in both Figures 16 and 17 are applied directly to the ground-air linkage 717, where they are transmitted to the aircraft 722 and applied as elevation correction signals to the autopilot approach coupler 723 in such aircraft. The transmuted and reflected radar signals 720, 721 respectively between the radar installation 700 and aircraft 722 complete a servo loop.

Azimuth error signals in Figure 16, originating in the azimuth angle tracking circuit 707 and appearing on lead 712, are limited, in limiter stage 725 (Figure 18A), in value prior to application to the course softening circuitry 715. Azimuth error voltages are also differentiated in "rate" stage 726, producing a rate of error signal with regard to time for application to the course softening circuitry 715. The resulting control signal, course softened as a function at range, consists of the addition of azimuth error signals and azimuth rate of error signals, multiplied by range. The composite information is transmitted by the ground-air link 717 to the aircraft's autopilot approach coupler 723.

When the system is set for "ground-computed rate," as shown in Figure 17, circuitry of the computer unit shown in Figure 18B supplies both azimuth error signals and azimuth rate of error signals to the aircraft. For use of the system in "ground rate" configuration, certain modifications or adjustments are necessary in the airborne equipment so that rate of error signals are not added by the autopilot approach coupler to those rate of error signals already transmitted from the ground equipment.

The output of the course softening circuitry 715, in both Figures 16 and 17, consisting of azimuth and elevation control voltages, is applied to the ground-air data link. The ground equipment of the data link consists of the AGCA coder unit, the AGCA transmitter mixer unit, and the BC–640A transmitter, all shown in Figure 7. The function of the coder unit is the translation of the D.-C. control voltages to a modulation of a suitable type for transmission on the carrier of the BC–640A transmitter. Range voltage, applied as a direct function from the tracking unit output, is also applied to the coder unit for transmission of range to touchdown information to the controlled aircraft. The airborne equipment of the ground-air link consists of a modified receiver for reception of V. H. F. transmission of the BC–640A transmitter, and the AGCA decoder unit which evaluates AGCA information transmitted over the ground-air link.

It is requisite that aircraft in the AGCA system be equipped with an autopilot and a suitable approach coupler for the translation of the decoder output to suitable autopilot control signals, and for the further translation of autopilot signals to changes of aircraft controls for the achievement of new flight situations. The controlled aircraft therefore represents a beginning and an end point for the AGCA loop of control.

The basic principles of the AGCA system when using "air computed rate," shown in Figure 17 differ from those of the system when using "ground rate," shown in Figure 16, in that the airborne autopilot approach coupler supplies rate of error signals to the autopilot by the differentiation of pure error signals transmitted by the ground equipment.

*Description of video standardizer or video shaper shown in Figures 7, 8 and 14*

In general, the video standardizer or shaper included on the chassis of the AGCA synchronizer accepts radar video from the radar trailer and produces pulses of equal width and amplitude for tracking purposes. The video standardizer accomplishes video shaping by measuring incoming radar echoes and utilizing all signals above a predetermined level to produce standardized pulses.

The input to the video shaper is either normal video produced by the apparatus illustrated in Figure 1 and appearing on lead 22, or, in the alternative, may be video developed in the so-called artificial aircraft unit, depending upon the position of a switch in the coder unit.

As seen in Figure 8, the circuitry of the video standardizer includes amplifiers 138, 139 and blocking oscillator 140A, 140B. The video selected by switch S–6003 is capacity coupled to the control grid of amplifier tube 138. The cathode of tube 138 is returned to ground through resistance 141, while the control grid is connected to an adjustable tap on the potentiometer resistance 142, having one of its terminals grounded and the other one of its terminals connected through condenser 143 to the movable switch element of switch S–6003. Such switch element is connected to the ungrounded terminal of the resistance 144. Thus the resistance 142 serves to control the amplitude of the video applied to the tube 138.

In general, the tubes 138, 139 are conventional video amplifiers with the anode of tube 138 coupled by means of condenser 145 to the control grid of tube 139. The voltage thus developed on the anode of tube 139 is applied through coupling condenser 146 to the control grid of the trigger tube 140A. The control grid of tube 140A is connected to the adjustable tap on the potentiometer resistance 148, such resistance 148 being connected in a voltage dividing circuit which includes the voltage source 150 and serially connected resistances 151, 148 and 152. More specifically, the control grid of tube 140A is connected to the adjustable tap on resistance 148 through the serially connected resistances 154, 155. A rectifier 156 is connected in shunt with resistance 155 and the tap on resistance 148 is bypassed to ground by condenser 158.

The anode of tube 140A is connected to receive the az.-el. intensifying gate appearing on the leads 90, 88 and having the form illustrated in Figure 4 such connection being made through the serially connected resistance 159 and winding 160 of the blocking oscillator transformer 161. The junction point of resistance 159 and winding 160 is bypassed to ground by means of condenser 162. The cathode of tube 140A is grounded. By these connections, it is observed that the tube 140A is rendered effective only during the periods of the azimuth or elevation scanning, i. e., only during those periods in which radar video is expected.

The cathode of tube 140B is returned to ground through resistance 163 which forms load resistance across which the standardized video output appears on lead 36. The control grid of tube 140B is connected through the winding 164 to the adjustable tap on the potentiometer resistance 166, such resistance 166 being in a voltage dividing circuit which includes the serially connected voltage source 167, resistance 168, resistance 166, and resistance 169. Bypass condenser 171 is connected between the cathode of tube 140B and the tap on resistance 166. The anode of tube 140B is connected through the serially connected winding 170 and resistance 172 to the positive terminal of voltage source 173.

While the gating voltage, i. e., the intensity gate, applied periodically to the anode of tube 140A, serves to assure operation of the circuit only during the time which radar video is being expected, additional means are provided to prevent the transfer of video during those portions of the azimuth and elevation scanning periods corresponding to the regions in which pattern clipping is illustrated in Figure 6.

Such additional means includes a connection from the lead 174 to the junction point of resistances 154, 155, to which the az.-el. negative-going limiter gate 40B is applied through the coupling condenser 175. This gating voltage 40B is of sufficient intensity to render the blocking oscillator stage 140A, 140B inoperative for the duration of such gating voltage 40B.

Crystal rectifier 176 connected in shunt with the grid return resistance 177 prevents overshoots in the grid circuit of tube 139, which may otherwise be produced in response to integration of the unblanking signal.

It is thus observed that in the presence of the unblanking gate applied to the anode of tube 140A, the tap on resistance 148 provides threshold adjustment of the level necessary to fire the blocking oscillator stage 140A, 140B. All pulses above the level determined by resistance 148, and occurring during the presence of the az.-el. unblanking gate, thus cause the blocking oscillator stage to produce pulses of standardized amplitude and width useful for tracking purposes.

*Description of one-tenth cycle per second sawtooth generator illustrated in Figures 7, 9, 10 and 11*

This generator, a searching sweep generator, mounted on the chassis of the AGCA synchronizer unit, generates a slow sweep voltage for application to the acquisition circuits of the tracking unit during the "search" function of the system. In general, this search sweep voltage is used to control the delay of the range gate, which is monitored by coincidence circuits of the different tracking units for the presence of aircraft video echoes. The characteristics of this search sweep voltage are illustrated in Figure 11.

To produce the voltage variation shown in Figure 11, the condensers 190 and 191, in Figure 9, are alternatively arranged to discharge through a discharge path which includes the tube 179 and resistance 199.

The circuitry of the searching amplifier generator illustrated in Figure 9 includes a voltage regulator tube 178 for stabilizing the screen grid voltage of tube 179, a cathode follower tube 180, an amplifier tube 181, clamp tubes 182 and 183 and a series of tubes 185, 186 connected in an Eccles-Jordan "flip-flop" circuit.

The operation of the sawtooth generator is initiated by the opening of the normally closed contacts of the thermal time delay relay 187, one of such contacts being connected to the lead 188 of positive potential and the other one of such contacts being connected (1) to the anode of tube 179, (2) to the ungrounded terminal of condenser 189, and control grid of tube 180, and (3) to fixed contacts 200, 201 of the relay 192. Thus, in the initial "cold" condition of relay 187 a positive potential of 150 volts on lead 188 is applied to the anode of tube 179; and such voltage charges capacitor 189 and either condenser 190 or 191 depending upon whether the relay 192 is energized or de-energized. As shown, relay 192 is de-energized and in such case condenser 191 is charged through contact 201. After the contacts of relay 187 open, the precharged condenser discharges through the tube 179 at a relatively slow rate. When the voltage at the anode of tube 179, and therefore at the cathode of the cathode follower tube 180, falls to a critical value determined by the setting of the tap on the so-called minimum adjust search speed resistance 193, tube 181 is cut off thereby de-energizing the relay 194.

It is observed that the cathode of tube 180 constitutes the output terminal 30 of the generator and that such cathode is connected to the negative voltage source 202 through the serially connected resistances 204, 193 and 205. The anode of tube 180 is connected to the positive ungrounded terminal of voltage source 206. The adjustable tap on resistance 193 is connected to the control grid of tube 181 through resistance 207. The cathode of tube 181 is grounded through the manually operable switch 208. The anode of tube 181 is serially connected with the winding of relay 194 to the positive lead 188.

It is observed that in the energized condition of relay 194, the condenser 195 is connected through resistance 209 to the negative lead 210 so as to be precharged at a negative potential. Upon de-energization of relay 194, as described previously, the negatively charged condenser 195 is connected to the cathodes of the clamp tubes 182, 183 which serve to limit the negative voltage applied respectively to the anodes of tubes 185 and 186. The discharge of condenser 195 thus results in a large negative-going pulse applied to the Eccles-Jordan trigger circuitry which includes the tubes 185, 186, a so-called "flip-flop" circuit. Such large negative-going pulse causes one control grid to rise suddenly above a cutoff value, initiating an amplifying function and causing the anode of that section to draw heavy current while the anode of the other section draws substantially no current. It is observed that the cathodes of the tubes 185, 186 are grounded and that the control grids of tubes 185, 186 are connected to the negative lead 210 through corresponding resistances 211, 212. Further, the control grid of tube 185 is connected to the anode of tube 186 through resistance 214; and likewise the control grid of tube 186 is connected to the anode of tube 185 through resistance 215. The anodes of tubes 185 and 186 are connected through resistance 216 to the positive terminal of source 206. The anode of tube 185 is serially connected with the winding of relay 192 to the positive terminal of voltage source 206.

Assuming tube 186 is undergoing the aforementioned cutoff function of the trigger cycle, relay winding 192 is de-energized as shown to apply the accumulated charge of condenser 191 to the anode of tube 179. On alternate cycles of relay 192 condensers 190 and 191 are alternately charged during their "off duty" period.

In the "off duty" period of condenser 190, as shown in Figure 9, the condenser 190 has its ungrounded terminal connected through relay contact 218 to the adjustable tap on the so-called maximum adjust search speed potentiometer resistance 197, such resistance 197 being in a voltage dividing circuit which includes the serially connected voltage source 206, resistance 220, resistance 197, and resistance 221. It is observed that in the "off duty" period of condenser 191 it is likewise charged with positive voltage supplied from the tap on resistance 197 but is charged in such case through the relay contact 223.

It is further observed that the condenser 189 supplies anode voltage to tube 179 during the time of relay switching, thus eliminating undesirable transients from having their effect on the az.-el. indicator display.

In order to stabilize the operation of tube 179, its screen grid is connected to the ungrounded terminal of the voltage regulator tube 178, such terminal being connected through resistance 224 to the source 206.

In order to control the rate at which the condensers 190, 191 discharge, i. e., to control the slope of the sawtooth waves illustrated in Figure 11, the control grid of tube 179 is connected to an adjustable tap on the resistance 196, such resistance being connected in a voltage dividing circuit which includes the serially connected voltage source 202, resistance 226 and resistance 196.

The switch 208 provides a recycling function, i. e., by opening the same the relay 194 is de-energized to cause the previously negatively charged condenser 195 to be applied to the flip-flop circuit as described above, to initiate a new cycle.

It is noted, as alluded to above, that the following controls have the following functions: the setting of the tap on resistance 197 determines the maximum voltage at which the condensers 190, 191 are charged, and hence determines peak voltage of the sawtooth wave; the setting of the tap on resistance 196 determines the slope of the sawtooth waves; while the setting of the tap on resistance 193 determines the minimum value of the sawtooth wave.

*Description of range tracking unit illustrated in Figures 7, 12 and 13*

The range tracking unit illustrated in block diagram form and in schematic form, respectively, in Figures 12 and 13, incorporates a servo loop functioning to cause tracking of an aircraft in range, such servo loop serving to develop certain control voltages for purposes of angle tracking computation as well as for producing other control effects.

The input to the range unit includes:

(1) Video over lead 72;

(2) System triggers over lead 12;

(3) The sawtooth voltage wave illustrated in Figure 11 over lead 30, such sawtooth wave, however, being effective only during the "search" function of the equipment;

(4) An angle gating voltage supplied to the tracking unit over lead 56 from the computer unit, such angle gating voltage serving in general to limit the time during which the range tracking unit responds to incoming video. This angle gating voltage may be considered as being the result of range and angle tracking and not a means for range or angle tracking and is illustrated in Figure 20;

(5) A "control on" signal developed in the coder unit and transferred over lead 74 is for control purposes. This control on signal and other input voltages enumerated below as input signals are in the form of control signals for the range tracking unit described under this heading.

Briefly, the control on signal, transferred over lead 74, is the result of "confirmation," i. e., an acknowledgment by an incoming aircraft that it is conditioned for reception of control signals which are thereafter transmitted from the ground to the aircraft for automatically controlling the flight of the same;

(6) Identification voltages transferred over lead 38; such identification voltages when applied by manually operating a switch on the control panel, serve to override the angle gates applied to lead 56, i. e., when identification voltage is present on the lead 38 the index marks developed in the range tracking unit are not limited to the short duration of the angle gate voltages;

(7) Warning and "wave off" interlocking voltages are transferred over lead 78 from the coder unit. For purposes of describing the range tracking unit, continuous 28 volts may be assumed to be present on lead 78;

(8) Index mark interlocking voltages are transferred from the coder unit over lead 76;

(9) The rejection bus 40 is connected between identical elements of different range tracking units in a multiplane landing system and the signals on this bus 40 may be considered either incoming signals or outgoing signals depending upon the relative positions of aircraft being tracked by the two interconnected range tracking units;

(10) The lead 64, during "cursor" operation serves to convey cursor signals from the computer unit to the range tracking unit.

The ouput signals from the range tracking unit are:

(1) Range voltage appears on lead 82 and the magnitude of such voltage serves as a measure of the range of the tracked aircraft;

(2) A "stretched video" signal is developed on lead 84 and serves to control other related units during that portion of the antenna beam scanning period when radar "hits" are being made on the incoming aircraft;

(3) A range voltage is also developed on lead 80 for control purposes only and is applied to the coder, such range voltage varying as the range voltage on lead 82, but being of smaller magnitude. This range voltage on lead 80 is used for transmitting to the incoming aircraft information as to its range from touchdown;

(4) Index marks or cursor pulses, as the case may be, appear on the output lead 42, such index marks being applied to an intensity control electrode of a cathode ray tube and constituting a pair of time spaced marks which bracket the image of the aircraft on the cathode ray tube screen for purposes of identification;

(5) A so-called "three-mile pick off" signal appears on lead 58 only when the tracked aircraft is within three miles of touchdown, such pick off signal being used for control purposes in the excess error wave off portion of the computer unit. This signal as well as the other output signals enumerated below are in the form of control signals;

(6) A so-called range gate appears on lead 44 and is applied to the overtake warning and wave off unit as well as to "gating central";

(7) A wave off signal is developed on lead 60;

(8) A "tracking on" signal is developed on lead 66 and applied to the computer unit and coder unit for purposes of conveying information to those units to the effect that the range tracking unit is changed from its "search" function to its "track" function;

(9) An alarm signal is developed on lead 62 to convey information as to loss of video.

In general, the range tracking unit includes a servo loop. The servo lop includes the multivibrator stage V2; the early-late gate generator V3 in the form of a blocking oscillator stage; the early and late gate detector stages V5 and V6, the differential integrator stage V7; the cathode follower clamp stage V8; the range integrator stage V9, V10; and the lead 35 extending from the stage V10 to the multivibrator stage V2 completes the loop. The voltage on such lead 35 is termed the "range voltage" and is a measure of the range of the tracked aircraft, when such aircraft is being tracked. The voltage on this lead 35 may be measured on the volt meter 227, i. e., the range meter 227, when the relay 243 is energized.

In order to obtain an indication of the speed of the tracked aircraft on the speed volt meter 231, such volt meter 231 is coupled to the lead 35 through a differentiating network and D.-C. amplifier which includes the tube V11. For that purpose, in the automatic position of switch 228, the lead 35 is coupled to the control grid of tube V11A through the stationary contact 233 and differentiating network, such differentiating network including the condenser 234 and resistance 235.

The cathodes of tubes V11A and V11B are interconnected by means of potentiometer resistance 236 which has its adjustable tap returned to ground through resistance 237. The anodes of tubes V11A and V11B are interconnected by means of condenser 239 and are supplied with space current from a 300 volt source through resistances 240 and 241, respectively. The control grid of tube V11B is grounded. The voltage developed between the anodes of tubes V11A and V11B, i. e., across condenser 239, is applied to opposite terminals of the speed volt meter 231. It is noted that the relay 243 is energized in the track function of the unit and is deenergized in the search function of the unit. In the track function the speed is indicated by meter 231; but such meter is disconnected in the search function to avoid damage to the meter inasmuch as searching occurs at a rate comparable to 3,000 miles per hour. It is observed that for this purpose one terminal of the meter 231 is serially connected with the adjustable resistance 245 to the anode of tube V11A; while the other terminal of meter 231 is connectible through the relay switch 243A to the anode of tube V11B.

The abovementioned servo loop includes two integrator circuits which include respectively the condenser 246 and condenser 247, condenser 247 being associated with the range integrator stage V9, V10. The voltage developed on condenser 246 is a measure of the velocity of the tracked aircraft and voltage derived from such condenser 246 is integrated in the stage V9, V10 and applied as aircraft range voltage to the aforementioned lead 35.

The manner in which the so-called speed voltage appearing on condenser 246 is developed, is now described in relationship to stages V1A, V2, V3, V5, V6 and V7.

The system trigger, in the form of a positive pulse, is applied through lead 12 to the control grid of the buffer amplifier tube V1A, and after amplification therein is applied as a negative pulse to the control grid of tube V2B. The tubes V2B and V2A comprise a part of the multivibrator stage V2. It is observed that the tube V2B, in its quiescent state, is highly conducting since a positive voltage appears at such time on its control grid. The cathodes of tubes V2B and V2A are interconnected so that in such quiescent state the cathode of tube V2A is at a relatively high positive potential. The so-called range voltage appearing on lead 35 is applied through resistance 249 and through a voltage dividing network 250 to the control grid of tube V2A.

The multivibrator stage V2 serves to develop a negative-going gating voltage 251 on the cathode of tube V2A, the duration of which varies in accordance with the magnitude of the voltage on lead 35. Such gating voltage is started upon appearance of the system trigger, in inverted form, to the control grid of tube V2B. The multivibrator stage V2 is thus termed a timing modulator since it serves to develop a negative-going gate on the cathode of tube V2B with a duration representative of the magnitude of the voltage appearing on the lead 35.

Such negative-going gating voltage 251 is differentiated by the differentiating network comprising condenser 252 and resistance 253, which are in the grid circuit of the blocking oscillator stage V3. A positive pulse corresponding to the trailing edge of the negative-going gating voltage 251 is thus applied to the control grid of the trigger tube V3A. Such positive pulse is, of course, delayed with respect to the system trigger in an amount corresponding to the duration of the negative-going gating voltage 251 developed in stage V2. It is noted that the potentiometer resistance 254 is adjusted so that with zero voltage applied to lead 35, a delay is interposed which corresponds to the aircraft touchdown position, while resistances 256, 257, 258 allow adjustment of the scale of the delay with respect to range voltage.

The blocking oscillator stage V3 has two separate output circuits, one of which includes the transformer winding 259 for developing a so-called early gating voltage or gate 260. A late gate 261 is developed on the anode of tube V3B. The first or "early" gate consists of a positive-going wave form 260 followed by a negative-going wave form and is applied to the suppressor grid of the early detector tube V5. The second or late gate 261 consists of a negative-going wave followed by a positive-going wave form and is applied to the suppressor grid of the late detector tube V6. These positive portions of the pulses 260, 261 produced by oscillator V3 thus appear alternately in the suppressor grids of the early-late gate detectors V5 and V6 causing them to be placed in a condition that they may conduct when positive gated video signals are coincidently applied from lead 262 to the respective control grids of tubes V5 and V6. In other words, tubes V5 and V6 are essentially coincident tubes arranged to conduct only when there is a positive signal applied both to their control grids and suppressor grids.

The manner in which the video appearing on lead 262 is gated is described in detail hereinafter but, in general, such video, when it appears, preferably has a uniform height and a uniform width, so that in effect such video may be uniformly compared with the positive portions of the wave forms 260 and 261.

The signal passed by the early-late detectors V5, V6 is applied to the grids of differential integrator circuits consisting of two triode sections V7A and V7B of stage V7.

It is observed that video signals corresponding with the positive-going portion of the early gate 260 are passed by tube V5. Video signals corresponding with the positive-going portion of the late gate 261 are passed by tube V6. The signal appearing on the anode of tube V5 is applied through the pulse transformer 264 to the control grid of integrator tube V7A so as to charge condenser 246. Video signals corresponding with the positive portion of the late gate 261 is passed by tube V6 and applied by pulse transformer 265 to the control grid of the integrator tube V7B, lowering the voltage on condenser 246. The combined effect, therefore, of the early-late gate detector circuitry is to charge condenser 246 when radar video corresponds with the early gate (indicating that the aircraft is moving forward at a rate greater than that of the range gate) and to discharge condenser 246 at the time of coincidence of video signal with the late gate (indicating that the gate is going forward at a greater rate than the aircraft). The combined output of tube V7A and V7B thus appearing across condenser 246 may be interpreted as a "Speed" voltage for the tracked aircraft. It is noted that the range gate mentioned in the previous sentence is defined by the positive portions of the wave forms 260, 261, such positive portions being displaced, of course, along the time axis. This range gate is formed using the mixer stage V4.

The mixer stage V4 includes the two cathode follower tubes V4A and V4B, each of which have their cathodes returned to ground through the common load resistance 266. The control grid of tube V4A is coupled through the parallel connected resistance 268 and rectifier 269, and serially connected condenser 267 to one terminal of the winding 259 to thereby receive the early gate voltages. The control grid of tube V4A is returned to ground through condenser 270.

The control grid of tube V4B is connected through the stationary relay contact 271 and condenser 272 to the anode of tube V3B so as to receive the late gate when the relay 273 is de-energized as shown in Figure 13. It is noted that the relay 273 serves generally to narrow the range gate and to increase the time constant of the servo loop in the "control" function of the equipment, i. e., after the incoming aircraft has confirmed or acknowledged that it is in condition for reception of transmitted control signals; or, more specifically, while angle tracking is being accomplished. For that purpose, the relay 273 is energized by the "control on" signal applied to lead 74. With relay 273 energized, the control grid of V4B is connected to a —150 volt source and is no longer receptive to the late gate; at the same time the resistance 276 is no longer short circuited by the relay switch 277, but such resistance 276 is then serially connected with the condenser 246. Thus with relay 273 energized, the range gate appearing on lead 262 has a time duration commensurate only with the time duration of the early gate and is substantially independent of the time duration of the late gate. As indicated in Figure 13, the range gate developed across resistance 266 has a time duration of approximately four microseconds in both the search and track functions of the equipment; but in the control function, the time duration is decreased to a value of approximately 2.2 microseconds. The manner in which the range gate thus developed on lead 275 is utilized is described in detail hereinafter.

As noted previously, a voltage representative of the speed of the aircraft is developed across condenser 246. The voltage appearing across condenser 246 produces a proportional voltage on the cathode of the cathode follower stage V8.

Stage V8 comprises tubes V8A and V8B, which have their cathodes interconnected and, in turn, connected to a —150 volt source through serially connected resistances 279 and 280, the junction point of which is bypassed to ground by means of condenser 281.

The voltage appearing on the cathodes of tubes V8A, V8B is applied to the control grid of the range integrator tube V9 through the normally closed relay switch 282 of relay 283. It is noted that the relay 283 is shown in its de-energized condition which corresponds to the condition wherein the circuit is adjusted for automatic tracking. Relay 283 is energized only during the time the apparatus is conditioned for so-called cursor operation wherein the switch 284 is set to its "cursor" position, thus remaining de-energized in the normal operation of the tracking loop. It is observed that the control grid of tube V9 is grounded by the normally closed relay switch 285 of relay 286. Relay 286 when de-energized as shown is in its search position; but such relay 286 is energized during the track function of the unit. Thus during the search function the control grid of tube V9 is grounded; but during the track function the voltage developed on the cathodes of tubes V8A, V8B is applied to the control grid of tube V9.

Thus, in automatic tracking, the speed voltages appearing on the cathodes of tubes V8A, V8B is applied to the control grid of the second integrator stage V9, and the integrator output appears on the cathode of cathode follower stage V10A. For that purpose, the anode of tube V9 is conductively connected to the control grid of tube V10A through the normally open relay switch 289 of relay 286. The cathode of tube V10A is returned to the negative terminal of a −150 volt source through a serial circuit which includes potentiometer resistance 290 and fixed resistance 291. The resistance 290 is shunted by the neon discharge tube 292. The integrating condenser 247 has one of its terminals connected to the cathode of tube V10A and the other one of its terminals connected through switch 282 to the control grid of tube V9. Control grid of cathode follower tube V10B is connected to the adjustable tap on resistance 290 so as to develop a corresponding voltage on its cathode. The cathode of tube V10B is returned to the −150 volt source through serially connected resistances 293 and 294.

A regenerative feedback path is provided between the output of the tube V10B and the input of tube V9, such feedback path comprising the serially connected thyrite resistance 297, the fixed resistance 298 and potentiometer resistance 299, which has its tap connected to the cathode of tube V9. The purpose of the thyrite resistance 297 is to introduce nonlinearity in the feedback circuit to compensate for curvature in the characteristic curves of the amplifier tube V9. The voltage thus developed on the cathode of tube V10 is the range voltage and is applied to the range voltage lead 35 in the automatic position of the manually operable switch 228. This voltage on the cathode of tube V10 consists of integrated "speed" voltage and represents the range of the tracked aircraft in terms of nautical miles on a linear scale, the scale being 15 volts per miles.

As indicated above, the voltage developed on lead 35 is applied to the control grid of tube V2A to complete the loop with the gate width of a multivibrator output 251 being controlled by the range voltage applied through the combination of resistances 250, 256 and 258. The pulse width of the output of multivibrator V2, controlled as a direct function of the range voltage, causes, in turn, revision of the range voltage in an amount depending upon the relationship of the incoming video with the pulse derived from the trailing edge of such gating voltage 251. Aircraft approaching the radar installation cause video pulses to coincide with the positive portions of the early gates 260, charging condenser 246, causing the "speed" voltage at the cathode of tube V8 to rise, and the range voltage from tube V9 to fall. Decreasing range voltage decreases the gate width of the output of the multivibrator V2.

*Coast speed circuitry in Figure 13*

As mentioned above, the range voltage on the cathode of tube V10 is applied to a voltage dividing circuit which includes the serially connected resistances 293A, 294. The junction point of the resistances 293A, 294 is connected through resistance 300 to the control grid of tube V1B, the so-called 3 mile pick off tube. Tube V1B is arranged to conduct only when the tracked aircraft is beyond 3 miles of touchdown. For that reason the tube is sensitized with range voltage as indicated above. The cathode of tube V1B is grounded and has its anode connected to a +300 volt source through resistance 301. The anode of tube V1B is likewise connected to a voltage dividing circuit which includes the serially connected resistance 303, potentiometer resistance 304, fixed resistance 305 and −150 volt source 306. The tap on resistance 304 is connected through the minimum coast switch 307 to the control grid of tube V8B in the on position of such switch. In the off position of such switch 307, the control grid of tube V8B is connected to the negative terminal of voltage source 310.

The tube V1B is adjusted so that it becomes cut off when the range voltage corresponds to distance less than 3 miles; and when such tube V1B cuts off, the voltage developed on the anode of tube V1B is not only transferred in controllable amounts to the control grid of tube V8B but is also transferred to the lead 58, which constitutes the so-called 3 mile pick off lead. The tap on resistance 304 may be adjusted to provide different minimum coasting speeds. Generally the voltage thus applied to lead 58 serves to render operative the excess error wave off circuitry in the computer unit only when the aircraft is within 3 miles of touchdown.

*Description of circuitry for developing "video on" signal in Figure 13 from range and angle gated video*

The "video on" signal is developed for control purposes. The circuitry produces for this purpose a square pulse of a high amplitude and sharp definition, the width of the pulse being equal to a time period of the entire video train within the range and angle gates, plus a 500 microsecond delay for the last pulse. Because of this additional delay of 500 microseconds, the "video on" signal is sometimes referred to as "stretched" video and is shown in Figure 20.

The range and angle gated video appearing on the anode of tube V15B is applied through condenser 383 to the cathode of the video stretch tube V18A. The cathode of tube V18A is connected to the adjustable tap on resistance 384 through the resistance 385, such resistance 384 serving as a voltage dividing element since its ungrounded terminal is connected to the −150 volt source. Condenser 386 has one of its terminals grounded and the other one of its terminals connected to the tap on resistance 384, such tap being likewise connected through resistance 387 to the anode of tube V18A. The control grid and anode of tube V18A are interconnected and connected through resistance 388 to the control grid of tube V18B. The cathode of tube V18B is connected through resistance 389 to the −150 volt source. The anode of tube V18B is connected to the −150 volt source through resistance 400. Condenser 401 is connected between the anode of tube V18A and ground. The control grid of cathode follower tube V19A is connected to the anode of tube V18B. The cathode of tube V19A is connected through resistance 403 and resistance 389 to the −150 volt source. The "video on" signal thus developed on the cathode of tube V19A is applied to the "video on" lead 84 through the track cursor switch 284, such switch 284 being manually operated and maintained in the "track" position in normal operation of the unit.

In summary, the output of blocking oscillator tube V15B is taken from the anode of that tube and applied to the cathode of video stretch tube V18A. The condenser 386 is charged by such video signal but the charge may leak from such condenser 386 at a rate determined by the magnitudes of resistances 387 and 384, the resistance 384 being termed the stretch control resistance, and the tap on the same is adjusted so that tube V18B is cut off for a period equal to a pulse repetition interval of 500 microseconds, such pulse repetition interval being that of the radar system. The effect of this circuitry therefore is the production of a "video on" signal at the cathode of tube V19A having a duration equal to a time period of the entire video train within the range and angle gates plus a 500 microsecond delay for the last pulse. This video on signal is divided into two branches of circuitry at the cathode of tube V19A, i. e., the video on signal storage circuitry, which includes the tube V23A, and the acquisition control circuitry, which includes the tube V19B. Also the video signal is applied to the "video on" lead 84 for performing certain control functions in the computer unit.

*Description of circuitry in Figures 12 and 13 for producing both range and angle gating of video, and description of features of rejection bus 40*

The range tracking circuit shown elsewhere and in Figures 12 and 13 is capable of performing its function even though the video supplied thereto over lead 262 is neither range gated nor angle gated but for purposes of accuracy, safety and definition, the video applied to lead 262 is both range and angle gated.

Briefly, the video, either standardized by using the video shaped illustrated in Figure 8 or unstandardized video appearing on lead 72, is applied to the control grid of the range coincidence detector tube V14. The suppressor grid of such tube V14 is coupled to the lead 275. When both positive video signals and positive range gates are present on control grid and suppressor grid of tube V14 contemporaneously, tube V14 conducts and the resulting pulse of current in the transformer 341 results in application of a pulse to the control grid of tube V15A. The anode supply for tube V15A comprises the angle gating voltages applied to lead 56. Thus, when the range gate video pulse developed on the grid of tube V15A is coincident with the angle gate appearing on lead 56, the tube V15 conducts to cause a pulse of current to flow through the transformer 343 and a resulting range and angle gated video pulse to appear on the control grid of tube V15B. The resulting range and angle gate video signal appearing on the cathode of tube V15B is applied to the lead 262 for purposes of effecting range tracking in the manner described previously.

The operation of this circuit may, however, be modified by signals developed in other tracking units and appearing on the rejection bus 40. Such signals appearing on the rejection bus 40 may render this circuit ineffective when such signals are coincident with the range gates applied to the suppressor grid of tube V14.

More specifically, the video appearing on lead 72 is transferred through coupling condenser 344 to the control grid of tube V14, such control grid being connected to the —150 volt source through serially connected resistances 345 and 346. The junction point of these two resistances 345, 346 is bypassed to ground by bypass condenser 347. The cathode of tube V14 is grounded. The anode of tube V14 is connected through primary winding 349 to the positive 150 volt source. The suppressor grid of tube V14 is coupled to the range gate lead 275 through the serially connected resistance 350 and condenser 351, the junction point of resistance 350 and condenser 351 being returned to ground through the serially connected resistances 352 and 353. The junction point of resistances 352 and 353 is connected to the ungrounded terminal of condenser 347.

Also coupled to the suppressor grid of tube V14 is the rejection bus 40 for purposes of producing the aforementioned overriding control effect occurring when pulses on the rejection bus 40 appear coincidently with range gates on lead 275. This is for the purpose of preventing two tracking units from tracking the same aircraft. For this purpose, the suppressor grid of tube V14 is connected to the anodes of inverter tubes V2A and V2B. The cathodes of inverter tubes V2A and V2B are interconnected and returned to ground through resistance 355 which is shunted by condenser 356. Likewise, these cathodes are connected to the —150 volt source through resistance 359A. The control grids of inverter tubes V2A and V2B are connected through resistance 357 to the —150 volt source and are coupled by means of condenser 358 to the stationary contact 367 of the single pole double throw relay switch 360. This relay switch 360 is a part of the search-track relay 288. The tubes V2A and V2B are thus tubes for the purpose of converting positive signals on the rejection bus 40 and applying the same as a negative pulse to the suppressor grid of tube V14 during, of course, the search function of the unit shown in Figure 13.

In multiplane tracking, it is understood that tracking units of the character shown in Figure 13 are duplicated and that the rejection bus 40 of each tracking unit is interconnected for the purpose of preventing more than one tracking unit tracking the same aircraft. In this respect it is noted that, while a tracking unit is performing its search function, it is receiving information, i. e., an angle gated range gate, over the bus 40 from other units while such other units are performing their track function; and that while the present unit is in the track function, it is supplying the same type of information, i. e., an angle gated range gate, to other units performing the search function so that such other units will correspondingly not track the same aircraft.

For purposes of developing such information, i. e., an angle gated range gate, the tube V13 is connected to receive angle gates on its anode and range gates on its control grid. More specifically, tube V13 is connected as a cathode follower coincident tube and has its anode connected to the lead 56 for receiving angle gates. The control grid of tube V13 is connected to the range gate lead 275 through serially connected resistance 360 and coupling condenser 361, the junction point of which is connected to the —150 volt source through serially connected resistances 362 and 363. The cathode of tube V13 is returned to ground through load resistance 364 and is connected to the stationary terminal 366 of switch 360 through condenser 369 and also to the so-called range gated automatic gain control lead RGAGC 40A. It is noted that the tube V13 requires for its operation a 28 volt enabling bias and that such bias is supplied upon energization of relay 370 during the track function of the equipment. In order to energize relay 370, a 28 volt range gate interlock is supplied from the coder unit to the lead 74.

When relay 370 is energized, the 28 volts are applied through the relay switch 371 and resistance 372 to the junction point of resistances 362 and 363 for the aforementioned purpose of rendering tube V13 operative.

Returning to the description of the connections to tube V14, the output of such tube is coupled through transformer 341 to the control grid of tube V15A. For that purpose, the cathode of tube V15A is grounded and its control grid is returned to ground through the serially connected transformer winding 375 and resistance 376, the junction point of which is connected to the —150 volt source through resistance 377. The anode of tube V15A is connected through the primary winding 379 of the transformer 343 to the angle gate voltage lead 56. The control grid of tube V15B is serially connected with transformer winding 380 and resistance 377 to the —150 volt source. The anode of tube V15B is connected through transformer winding 382 to the positive 300 volt source. The cathode of tube V15B is returned to ground through load resistance 378 and is likewise connected to the lead 262 for purposes of applying both range and angle gated video to the tracking circuit described under a different heading. A condenser 381 is connected between the cathode of tube V15B and one terminal of resistance 377.

In order to develop the "video on" signal described under a different heading, the range and angle gated video appearing in inverted form on the anode of tube V15B is transferred to the cathode of tube V18A through coupling condenser 383.

Recapitulating, standardized video appearing on lead 72 is applied to the control grid of coincidence tube V14. In the absence of a rejection gate which may be on the rejection bus 40, and at the coincidence of the delay of the range gate applied over lead 275 to the suppressor grid of tube V14 with the duration of the video, a signal is passed by the coincidence detector V14 and applied to the blocking oscillator stage V15A, V15B. This blocking oscillator stage is angle gated by the +240 volt angle gate developed in the computer unit and appearing on lead 56. The output from the blocking oscillator stage V15A, V15B thus occurs only when the following conditions are fulfilled: (1) The range delay of the video coincides with the delay of the range gate; (2) during search condition there is no signal upon the rejection bus at the point determined by requirement No. 1; and (3) the video occurs within the angle gate while the unit is in its track or control function.

Video meeting these three conditions appears on the cathode of tube V15B, i. e., lead 262 has a standardized pulse and is applied simultaneously to the control grids of early and late detector tubes V5 and V6 in the range tracking circuit.

*Description of means for applying range gate to lead 44 in figures 12 and 13*

As described above, the range gate appearing on lead 275 and developed across the common cathode load resistance 266 constitutes, in effect, the positive portions of both early and late gates 260 and 261. The range gate thus appearing on lead 275 is applied through condenser 361 to the control grid of cathode follower tube V–24B. A positive range gate is thus developed on the cathode load resistance 436 and applied through coupling condenser 437 to the range gate lead 44 for purposes of effecting certain control operations.

The computer circuitry is illustrated in Figures 18A, 18B and 19. In general, the computer performs six major functions, namely, to produce (1) angle voltage level shifting, (2) the computation of an "ideal glide path," (3) angle air tracking, (4) course softening, (5) excess air wave off, and (6) the generation of an angle gate. In general, the azimuth and elevation angle voltages applied to the terminals 18 and 20, respectively, are shifted in level as a step in the glide path computation process.

In version of azimuth angle voltage, made possible by the two-position switch SW–3001, permits the selection of either a "left runway" or a "right runway" approach; i. e., the radar equipment may be placed either on the left or on the right of the runway.

Range voltage generated in the tracking units described in connection with Figures 12 and 13 and the range of a tracked aircraft is applied to the computer glide path reference generator which in general includes the input terminal 82 and the stages 451 (V16A), 452 (V16B), 453 (V17A) and 454 (V17B). Such reference generator includes the nonlinear thyrite resistances 456, 457 so as to impart a nonlinear characteristic to the range voltage applied to terminal 82. The modified range voltage is added to the shifted az.-el. voltages resulting in the generation of an alternating voltage representing, at the zero crossover points, an "ideal" glidepath which is so adjusted as to coincide with an actual physical "ideal" approach to a given air field. Such alternating voltages, for azimuth purposes, appear on the lead 459 and, for elevation purposes, appear on the lead 460. The glide path generated by this circuitry may be displayed upon the az.-el. monitor scope during the "search" condition of the particular channel. These alternating voltages, for azimuth purposes, appear on the lead 462 and, for elevation purposes, appear on the lead 463.

The voltage appearing on the leads 462, 463 represent, in one instance, modified range voltage added algebraically to level shifted azimuth voltage and, in the second instance, range voltage modified in a different manner added algebraically to level shifted elevation angle voltage.

In general, such alternating voltages with a periodicity of two cycles per second are applied, respectively, from their leads 462 and 463 to cathode follower stages 465 and 466, each of such cathode follower stages forming an input circuit for the azimuth servo loop 467 and elevation servo loop 468. Briefly, such servo loops produce a voltage on the leads 469, 470 of servo loops 467, 468, respectively, such voltage on leads 469 and 470 constituting a substantially continuous voltage which represents the position error of the tracked aircraft in azimuth and elevation, respectively. Such voltages appearing on leads 469 and 470 are indicated on the cross pointer meter 471 and are utilized to modulate a carrier wave which is transmitted from the ground station to the aircraft for purposes of controlling the flight of the aircraft. The alternating azimuth and elevation voltages appearing in the output circuits of the cathode follower stages 465 and 466 are used to form azimuth and elevation angle gates, such angle gates being applied to the range tracking circuitry illustrated in Figures 12 and 13. Briefly, for purposes of developing such azimuth and elevation angle gates, level shifting potentiometers 472 and 473 are provided with their taps being connected to stationary contacts of the single pole double throw relay switch 474 serving to alternately apply the azimuth and elevation alternating voltages to the differential amplifier stage 475 (comprising tubes V12A and V12B) in the angle gate generator 477. The output of the gate generator 477 appears alternately as an azimuth and an elevation angle gate on lead 56. Azimuth angle voltage appearing on lead 18 is applied to the control grid of cathode follower tube 478. Such azimuth angle voltage is shifted in level and appears on lead 479 where the same is mixed on the control grid of cathode follower mixer tube 480 with the modified range voltage which appears on lead 459. In the left position of switch SW–3001, the level shifted azimuth voltage is mixed directly with the modified range voltage without inversion; but, in the right position of switch SW–3001, the azimuth angle voltage is not only level shifted but also inverted before being mixed with the modified range voltage appearing on lead 459.

To achieve these results the following circuitry is associated with tube 478. The cathode of tube 478 is returned to the negative ungrounded terminal of voltage source 481 through a series circuit which includes resistances 482, 483, 484, 485 and 486. The resistance 483 constitutes a so-called "touchdown adjustment for left runway operation" and has its adjustable tap connected to the left stationary contact of switch SW–3001 through the serially connected resistance 489 and adjustable resistance 490. The movable contact of switch SW–3001 is connected to lead 479 which in turn is connected directly to the control grid of the cathode follower mixer tube 480. The resistance branch comprising resistances 482, 483 and 484 has connected in shunt therewith the serially connected resistances 492 and 493, the resistance 493 comprising a potentiometer type of resistance termed the "touchdown adjustment for right runway operation" and has its movable tap connected to the control grid of the inverter tube 494 through resistance 495. Tube 494 is useful only during right runway operation; i. e., when the radar equipment is located on the right of the runway. The anode of tube 494 (V3A) is connected through the load resistance 496 of the positive terminal of a voltage source (not shown) and is connected directly to the control grid of tube 498 (V3B). The cathode of tube 494 is returned to ground through resistance 500 and is connected to the cathode of tube 498 through resistance 502. Tube 498 constitutes a cathode follower with its cathode connected to the ungrounded terminal of voltage source 504 through serially connected resistances 506 and 507. The junction point of resistances 506 and 507 is connected on the one hand through resistance 508 to the control grid of tube 494; and on the other hand such junction point is connected through serially connected resistances 570 and 571 to the right stationary contact of switch SW–3001.

In order to stabilize the potential appearing on the cathode of the input tube 478, a voltage regulator tube 513 is serially connected between the cathode of tube 478 and the junction point of resistances 485 and 486.

Thus, the operation of the azimuth angle voltage mixing circuit described immediately above is as follows: Azimuth angle scanning voltages varying from 52 volts to 2 volts and applied to terminal 18 appear on the grid of the cathode follower tube 478 (V1A). The output from the stage 478 is derived from its cathode and shifted downward in level through circuitry including the voltage regulator tube 513 (V2), which stabilizes the voltage drop across the voltage dropping resistance network. When switch SW–3001 (runway select) is set to the "left position" (for operation of the radar installation at the left side of the runway), the level shifted azimuth angle voltage is resistively mixed with the reference voltage; i. e., modified range voltage which is derived in the output circuit of the cathode follower tube V16B, and applied to the control grid of cathode follower tube V80 (V1B) over lead 459 which is serially connected with resistance 515, such resistance 515 being shunted by condenser 516. The output from the cathode follower stage 480 and appearing at the junction point of resistances 518 and 519 is applied through the serially connected resistances 520 and 521 to the azimuth angle tracking circuit; i. e., to the control grid of tube 465. Potentiometer resistance 483, the so-called "touchdown adjustment for left runway operation," is adjusted to provide zero azimuth angle voltage when the angular position of the radiated antenna beam passes through the aircraft touchdown point. At the same time the tap on potentiometer resistance 490 is adjusted to provide the proper excursion of the level shifted angle voltage which is added to the reference voltage; i. e., the modified range voltage.

In right runway operation, i. e., when the runway select switch SW–3001 is set to the "right position," level shifted azimuth angle voltage appearing on the tap of resistance 493 is applied to the inverter stage 494 (V3A). The output of stage 494 is applied to the cathode follower stage 498 (V3B) and varied by series resistance 511, the so-called "position adjust right runway," which produces the result identical to that produced by resistance 490 in left runway operation.

For purposes of producing level shifted and inverted elevation voltage for mixing with reference voltage, the elevation angle voltage is applied to terminal 20, such terminal being connected to the control grid of inverter tube 522 through resistance 524. The cathode of tube 522 is returned to ground through resistance 525 and is connected to the cathode of tube 526 through resistance 528. The tube 426 is a cathode follower and has its cathode connected to the negative ungrounded terminal of voltage source 530 through serially connected resistances 531 and 532. The junction point of resistances 531 and 532 is connected on the one hand through resistance 533 to the control grid of tube 522; and on the other hand such junction point is connected to the control grid of the cathode follower stage 534. The cathode of stage 534 is returned through serially connected resistance 536, 537 and 538 to the —150 volt source. The resistance 537 is a potentiometer resistance and serves as a touchdown adjustment, such resistance 537 having its adjustable tap connected through resistance 540 to the control grid of cathode follower mixer stage 541. Tube 541 has its cathode connected through serially connected resistances 543 and 544 to the —150 volt source. The junction point of resistances 543, 544 is connected through lead 463 and serially connected resistances 545 and 546 to the elevation angle tracking circuit; i. e., to the control grid of tube 466. The resistance 546 is shunted by condenser 548.

Thus, elevation angle voltage varying from 2 to 52 volts, depending on the angular position of the radiated antenna beam, is applied to the control grid of the inverter amplifier tube 522 the output of which is shifted downward in level in the cathode circuit of cathode follower tube 526. This level shifted elevation voltage is shifted further downward in the cathode circuit of cathode follower stage 534, and potentiometer resistance 537 is adjusted to provide a zero potential when the antenna beam passes through the elevation touchdown position. This level shifted output from cathode follower stage 534 is added to the reference voltage; i. e., modified range voltage appearing on lead 550. Such modified range voltage is applied through the two-position glidepath select switch SW–3001. Switch SW–3001 allows inspection of one of two series potentiometer resistances 551 or 552. Either of these two resistances allows an adjustment of the output of the reference generator for a given input, and therefore an adjustment of the angle of the computed glidepath.

The range voltage generated in the range tracking unit illustrated in Figures 12 and 13 is applied to terminal 82, such range voltage serving as a measure of the range of the aircraft being tracked. Range voltage thus appearing on terminal 82 is applied to the control grid of the cathode follower tube 451 through the tap on the so-called "range factor" of potentiometer resistance 560, one terminal of such resistance 560 being grounded. The cathode of tube 451 is connected through series resistances 562 and 563 to a —150 volt source. A condenser 564 is connected between terminal 82 and the control grid of tube 451. The junction point of resistances 562 and 563 is connected through series resistances 565 and 566 to the control grid of tube 568 (V17A), such resistances 565 and 566 being shunted by condenser 569. The control grid of tube 568 is returned to ground through the "L" thyrite resistance 456. The cathode of the cathode follower stage 568 is connected through series resistances 570, 571 and 572 to a —150 volt source. The adjustable tap on resistance 571 is connected through adjustable resistance 573 to the control grid of the cathode follower tube 575 (V17B). Condenser 577 is connected between the tap on resistance 571 and the tap on resistance 573. The control grid of cathode follower tube 575 is returned to ground through the "M" thyrite resistance 457 and is connected to the control grid of the cathode follower tube 452. The cathode of tube 452 is connected through series resistances 578 and 579 to a —150 volt source. The cathode of tube 575 is connected through series resistances 580 and 581 to a —150 volt source, and the junction point of such resistances 580 and 581 is connected to the movable contact of the glidepath select switch SW–3001 for supplying modified range voltage to the control grid of tube 541 where such modified range voltage is mixed with level shifted elevation angle voltage. On the other hand, the output appearing at the junction point of resistances 578 and 579 is transferred over lead 459 and resistance 515 to the control grid of tube 480 to which is also applied level shifted azimuth angle voltage.

Thus, in operation of the reference voltage generating means described above, range voltage, is generated in the tracking unit illustrated in Figures 12 and 13, is applied to the cathode follower tube 451 through the range factor resistance 450, the tap on resistance 560 being adjusted to determine the portion of the full excursion of range voltage applied to the reference generator circuitry. This range voltage is shifted downward in level at the cathode of tube 451 and applied to the control grid of the cathode follower tube 568. The potential of the control grid of tube 568, however, is modified by the thyrite resistance 456. The characteristics of this voltage modification are such that increasing applied potentials do not produce the same relative increase in voltage drop across resistance 456. Stated in a different manner, additional increments of input voltage are not matched by equal increases in voltage at the cathode of tube 568. The output of tube 568 is applied to the control grid of cathode follower tube 575 where further modifications are imparted by the thyrite resistance 457. Thyrite resistances 456 and 457 are such that the added characteristics imposed by these two elements cause the voltage variations following the general equation $$E_r-(E_i)(1-1/n).4-51$$

The elevation and azimuth angle tracking circuits are substantially identical in nature and function and for that reason, the following detailed description of the elevation angle tracking circuit suffices to describe the azimuth angle tracking circuit.

The elevation angle tracking circuit includes the cathode follower tube 466 (V–20A), the amplifier tubes 600, 601 (V–31A, V–31B), the clamp tubes 604, 605 (V–21A, V–21B), the cathode follower tube 606 (V–33B), the cathode follower stage 607 (V–33A), the limiter tubes 608, 609 (V–32A, V–32B), the amplifier tubes 612, 613 (V–22A, V22B) and the cathode follower tube 614 (V–20A).

The elevation angle tracking circuit comprises a servo loop with a feedback path provided by the lead 470. The voltage developed on lead 470 is continuous in nature and represents the position error of the tracked aircraft. The control grid of cathode follower tube 466 is connected to lead 470 through resistance 620, so that the same is sensitive to position error; and such control grid is likewise connected with resistance 546 so as to be sensitive to the algebraic sum of reference voltage and level shift, i. e., modified range voltage and level shifted elevation voltage. This voltage applied through resistance 546 is undulatory in character and its zero value, as mentioned previously, corresponds to a point on the predetermined glidepath. The cathode of tube 466 is connected to a minus 150 volt source through three parallel connected resistances and resistance 620, such parallel resistances comprising resistances 621, 622, 623. The tap on resistance 621 is connected to elevation angle gate generating means as described elsewhere herein for purpose of producing an angle gate, which in turn, is applied to the range tracking unit for forming angle gated video.

The tap on resistance 623 is connected to the control grid of the amplifier tube 600 through resistance 625. The cathodes of tubes 600 and 601 are both grounded and the anode of 600 is connected through resistance 626 to a positive 300 volt source. The anode of tube 600 is connected to the control grid of tube 601 through a network which includes the parallel connected resistance 628 and condenser 629. The control grid of tube 601 is connected through resistance 630 to the minus 150 volt source and such grid is also bypassed to ground by means of condenser 632. The anode on tube 601 is connected through resistance 632 to the positive 300 volt source and the voltage developed on such anode is transferred through resistance 635 to, on the one hand, the cathode of tube 604 (V–21A) and on the other hand, to the anode of tube 605 (V–21B). The control grids of tubes 604 and 605 are connected through resistances 640, 641 respectively to lead 642, to which in turn is applied the video on signal from terminal 84. Such video on signal is described elsewhere herein, is developed in the tracking unit and is present during the time "radar hits" are being made on the tracked aircraft. The lead 642 is connected through resistance 644 to a minus 150 volt source to provide bias for the control grids of tubes 604 and 605. The anode of tube 604 and cathode of tube 605 are connected to the control grid of tube 606 and are returned to ground, through an integrating network which comprises a serially connected condenser 646 and resistance 647.

The tube 606 is a cathode follower and has its cathode returned to ground through resistance 649. Also, such cathode is connected to a minus 150 volt source through serially connected resistances 650 and 651. The resistance 650 is connected in shunt with condenser 652. The junction point of resistances 650, 651 is connected through resistance 654 to the control grid of tube 612.

The anode of tube 612 is connected through load resistance 656 to a positive 300 volt source and is likewise connected to the control grid of tube 613. The cathode of 612 is returned to ground with resistance 658. Condenser 659 is connected between the control grid 612 and the cathode of tube 613.

The tube 613 is a cathode follower and has its cathode returned to ground through the serially connected resistances 670 and 658. Also, the cathode of tube 613 is connected to a minus 150 volt source through the serially connected resistances 672, 673, 674 and 675. The junction point of resistances 674 and 675, is connected through the single pole double throw relay switch 680 (during tracking) to the control grid of the cathode follower tube 614. The adjustable tap on resistance 673 is connected to the movable contact of the single pole double throw relay switch 681.

The cathode of tube 614 is connected through lead 470 and resistance 620 to the control grid of tube 466 to complete a feedback loop. Also, the cathode of tube 614 is connected to an adjustable tap on the resistance 682, one terminal of resistance 682 being connected to resistance 683, and the other terminal of resistance 682 being connected to lead 684, for purposes of transferring air voltage to the air indicator.

*Angle gate generator in computer in Figure 18B*

The circuitry described under this heading is used to provide a so-called angle gate which is applied to the range tracking unit shown in detail in Figure 13. In general, the purpose of this angle gate is to gate the video signals applied to the range tracking circuit in such a manner that such video signals are allowed to pass to the tracking circuit only during the time during which radar hits are being made on an aircraft being tracked, as illustrated in Figure 20.

It is noted that the ideal course of glidepath, as described elsewhere herein, is represented by the zero voltage crossover points on alternating voltages, one corresponding to azimuth, i. e., course, and the other corresponding to elevation, i. e., glidepath. These alternating voltages comprise, for azimuth purposes, the addition of level shifted azimuth angle voltage to the reference voltage, i. e., modified range voltage; and, for elevation purposes, comprise the algebraic sum of level shifted elevation angle voltage and the reference voltage, i. e., the modified range voltage.

The angle tracking servos have supplied thereto these two different alternating voltages representing at the zero voltage crossover points on ideal glidepath and course which are so adjusted to coincide with an actual physical "ideal" approach to a given airfield. The voltage on lead 469 in the case of azimuth and lead 470 in the case of elevation represent the error of the aircraft with respect to such ideal course or glidepath as described previously herein. The grid of tube 465, being connected to the junction of resistors 521 and 516, bears a voltage which is the sum of the aforementioned alternating voltage and the aforementioned error voltage. This grid voltage is therefore an alternating voltage whose zero crossover point represents the time the beam crosses the aircraft, whether or not the aircraft is on the ideal course, provided, of course, that the aircraft is being tracked. Likewise, in the elevation case, the voltage at the grid of tube 466 is an alternating voltage whose zero crossover point defines the position of the aircraft.

These voltages are applied to opposite stationary contacts of the relay switch of the az.-el. relay switch 474 and are supplied, for azimuth purposes, from lead 840 which is connected to the adjustable tap on the potentiometer resistance 472; and for elevation purposes, such alternating voltage is supplied over lead 841 which is connected to the adjustable tap on the potentiometer resistance 621.

The movable contact of switch 474 is connected through resistance 842 to the control grid of the first tube 844 and the differential amplifier 475. Tube 846 comprises a second tube of such differential amplifier. The cathodes of tubes 844 and 846 are returned to ground through a common resistance 847. The anode of tube 844 is connected to a +150 volt source through resistance 848 and is connected to the control grid of tube 850. The control grid of tube 846 is grounded and its anode is connected to a +150 volt source through resistance 851 and such anode is also connected to the control grid of tube 853.

In general, the circuitry associated with the differential amplifier 475 is so arranged that the output of both sections 844, 846 is zero for zero input at the control grid of tube 844. For other values of input voltage, the output of one of the sections 844, 846 is positive, resulting in a wave form on the connected cathodes of tubes 855 of the character illustrated at 856. This wave form 856 is shifted in level through circuitry including the voltage regulator tube 858 and is made available in two circuit branches through adjustable tubes on the resistances 860, 861.

For this purpose, the tubes 850, 855 are cathode followers and each have their cathode connected to one terminal on tube 858, the other terminal on tube 858 being connected to a —150 volt series through resistances 864, 861 and 865. Resistance 860 is connected in shunt with resistance 861. The taps on resistances 860 and 861 are connected to opposite stationary contacts of the az.-el. relay switch 867, which has its stationary contact returned to ground through resistance 870 and which is connected to the control grid of tube 872 through resistance 873.

Tube 872 has its anode connected to the control grid of tube 875 and such anode is likewise connected to a +300 volt source through resistance 876. The cathode of tube 872 is connected through resistance 877 to a —150 volt source and to one terminal of the neon tube 878; such cathode is also connected to a stationary contact of the relay switch 879.

The tube 875 has its anode connected to a +300 volt source and its cathode returned to ground through resistance 881, such cathode being also connected to terminal 56 which constitutes the az.-el. angle gate terminal.

The width of the angle gate produced by this circuitry is now described. The point at which voltage wave form 856 (approaching zero from either direction) is effective in cutting off the flow of space current to tube 872 is separately determined for the azimuth and elevation functions by adjustment of the taps on resistances 861 and 860. Application of the negative wave form 856 to the control grid 872 results in a positive D.-C. gate on the cathode of cathode tube 875 of the character illustrated at 882.

It is observed that the angle gating circuitry described above is operative only after initiation of the "control" condition, i. e., after confirmation by the aircraft, at which time a ground is removed from the cathode of tube 872, i. e., upon application of the +28 volt confirmation voltage to the relay winding 885, which has associated therewith the aforementioned switch 879.

By thus providing the angle gate 882 and applying the same to the tracking unit as described elsewhere herein, gating of azimuth and elevation video targets is achieved. Such gating is desirable to prevent the tracking of undesired targets at the same range but at varying angles from the desired video.

*Cursor generator illustrated with reference to Figures 24 and 25*

While described previously in connection with Figures 1 and 5, the glidepath course line 149A (Figure 6) and runway course line 150A, may be produced using the cursor generator described in the aforementioned copending application of Raymond B. Tasker, Serial No. 222,512, such glidepath and course line being preferably produced using the means and techniques described under this particular heading.

The cursor generator in Figures 24 and 25 includes a servo loop using a D.-C. amplifier and two thyrite elements. The amplifier includes stages 1100, 1101 and the two thyrite resistors are the thyrite resistances 1102 and 1103. The output of the amplifier 1100, 1101 is returned through circuitry containing such thyrite elements, whose characteristics are imparted to the amplifier's output. This modified output is returned to the input of the first D.-C. amplifier 1100 in opposition to the input voltage, such input voltage comprising level shifted azimuth or elevation angle voltage, as the case may be, which is selected by single pole double throw relay switch 1104.

In seeking to achieve a zero input, the D. C. amplifier 1100, 1101 provides a delay voltage for the multivibrator stage 1107. The characteristic of such delay multivibrator 1107 is such that it will produce an output meeting the conditions for the display of an "ideal" glidepath. The output of the delay multivibrator 1107 is applied to a blocking oscillator stage 1108 which, in turn, is coupled to the terminal 42, such terminal being connected to an intensity control electrode of the cathode ray tube 11 (Figure 6).

The output of the stage 1108 constitutes a series of pulses, the individual pulses being delayed in different amounts so as to produce an ideal reference glidepath and course line for an aircraft under AGCA control.

It is noted that portions of the circuitry described under this heading are similar to those used in glidepath computation circuitry of the AGCA computer, in that cursor pulse delay voltages are derived from level shifted azimuth and elevation angle voltage by the aforementioned electronic servo loop using the thyrite elements 1102, 1103.

The azimuth and angle elevation voltages are first level shifted and for that purpose, the azimuth angle voltage appearing on lead 1110 is applied to the control grid of tube 1111, which is returned to ground through resistance 1112. The tube 1111 is a cathode follower and has its cathode connected to a negative 150 volt source through the "touchdown course" resistance 1114 and resistance 1115. The tap on resistance 1114 is connected to the control grid of the cathode follower tube 1117 which has its cathode connected to a —150 volt source through resistance 1120. The cathode of tube 1117 is connected through the adjustable "distant range course" resistance 1121, to a stationary contact of switch 1104 to provide to such terminal a level shifted azimuth angle voltage.

The elevation angle voltage appearing on lead 1125 is applied through resistances 1126 and 1127 to the control grid of the inverter amplifier tube 1128, which has its cathode returned to ground through resistance 1130 and which has its anode connected to a +300 volt source through resistance 1131.

The anode of tube 1128 is connected to the control grid of cathode follower tube 1132, which has its cathode connected to the cathode of tube 1128 through resistance 1133 to provide a regenerative connection. Also the cathode of tube 1132 is connected to a —150 volt source through serially connected resistance 1135, the "touchdown glidepath" resistance 1136 and resistance 1137. The junction point of resistances 1136, 1137 is connected through resistance 1138 to the junction point of resistances 1126, 1127. The adjustable tap on the "touchdown glidepath" resistance 1136 is connected through the adjustable "distant range glidepath" resistance 1140 to a stationary contact of switch 1104 to provide a level shifted elevation angle voltage on such contact.

The movable switch element of switch 1104 operated by periodically energizing the relay winding 1150 with az.-el. relay voltage serves to supply a level shifted azimuth or elevation angle voltage through resistance 1151 to the control grid of tube 1100. The control grid of tube 1100 constitutes a part of the input circuit to the servo loop which is now described in detail.

The cathode of tube 1100 is grounded and the anode of the same tube is connected to a +150 volt source through resistance 1152. Also, the control grid of tube 1100 is connected to a —150 volt source through the serially connected resistances 1154, 1155.

It is noted that the resistance 1155 is connected in the cathode circuit of the cathode follower tube 1156 so as to supply, in degenerative sense, a feedback voltage through resistance 1154 to the control grid of the input tube 1100.

The amplified voltage appearing on the anode of tube 1100 is transferred to the control grid of tube 1101 through resistance 1157 which is shunted by condenser 1158. The control grid of tube 1101 is connected to a —150 volt source through resistance 1160 and the cathode of such tube is grounded. Resistance 1157 may be 2.2 megohms, condenser 1158 may be 22 microfarads, and resistance 1160 may be 3.3 megohms.

The anode of the amplifier tube 1101 is connected to a +150 volt source through resistance 1162 and such anode is conductively connected to the control grid of the amplifying tube 1163 through resistance 1164 so that the amplified voltage appearing on the anode of tube 1101 is applied to the control grid of tube 1163.

The control grid of tube 1163 is connected to a —150 volt source through resistance 1166. The anode of tube 1163 is connected to a +300 volt source through resistance 1168. The cathode of tube 1163 is connected to ground through resistance 1170 and is also connected to the so-called "cursor range voltage" lead 1172 through resistance 1174. Also, the cathode of tube 1163 is connected to a —150 volt source through resistance 1175.

The amplified voltage appearing on the anode of tube 1163 is connected through the single pole double throw switch 1177 ( in its "operate" position) to the control grid of the cathode follower tube 1179 which has its cathode connected to the aforementioned lead 1172 and also to a —150 volt source through resistance 1180. This lead 1172 upon which the "cursor range voltage" appears is returned to ground through resistance 1181 and the so-called "course linerarity" resistance 1184. The junction point of resistances 1181, 1184 has connected thereto one terminal of an adjustable so-called "glidepath flare" resistance 1185. The other terminal may have applied thereto, if desired, voltages varying in a predetermined manner for purposes of imparting a "flare" to the electronically produced glidepath, or such other terminal may be periodically grounded through a switch of the az.-el. relay 1150 as indicated in Figure 25. The voltage thus developed on the lead 1172 is transferred in a degenerative sense to the control grid of the tube 1100 by the means which are now described in detail.

Lead 1172 is bypassed to ground through a one-tenth microfarad condenser 1188, which acts as a filtering condenser assuring the application of only substantially continuous voltages to the control grid of tube 1190 through the so-called "high adjust" resistance 1191 which is shunted by condenser 1193. Resistance 1191 may have a total resistance of 1 megohm and condenser 1193 may be 22 microfarads.

The "L" thyrite resistance is connected between the control grid of tube 1190 and ground so that the nonlinear characteristic of the thyrite produces a desired effect on the voltage applied from lead 1172 to such control grid.

The tube 1190 is a cathode follower and has its cathode connected to a —150 volt source through serially connected resistances 1195 and 1196. The resistance 1195 is termed a "thyrite zero set" resistance and has its adjustable tap connected through a so-called "low adjust" resistance 1197 to the control grid of the cathode follower tube 1156. The resistance 1197 is shunted by condenser 1199. The resistance 1197 may have a value of 100,000 ohms and condenser 199 may be 122 microfarads.

The "M" thyrite resistance 1103 is connected between the control grid of the cathode follower tube 1156 and ground so that its nonlinear characteristics are imparted to the voltage applied to such control grid. The voltage thus developed on the cathode of tube 1156 is applied through resistances 1200 and 1154 to the control grid of tube 1100.

The servo loop described immediately above, which includes the feedback "course range voltage" lead 1172 operates such that the output voltage i. e., the voltage feedback to the control grid of tube 1100 seeks to balance itself against input potentials, i. e., elevation or azimuth angle voltages, as the case may be, applied through resistance 1151, thereby creating a virtual ground at the control grid of tube 1100, since the feedback path includes the thyrite resistances 1102 and 1103 which impart their characteristics upon the voltage and ultimately return to the control grid of tube 1100.

In seeking the aforementioned balance at the control grid of tube 1100, the voltage appearing on the lead 1172 varies in a predetermined manner as a function of time, and, of course, as a function of azimuth or elevation angle voltage, as the case may be. Theoretical considerations involved in these functional variations of voltage on lead 1172 in relationship to the physical position of the glidepath and course line with respect to the geometry of an aircraft landing field and the disposition of radar equipment adjacent to such landing field, are more fully described in the aforementioned copending application of Raymond B. Tasker et al., Serial No. 222,512.

The desired variation of voltage on lead 1172 is applied through the tap on resistance 1184 to the control grid of tube 1204, which constitutes an element of a range delay generator functioning to produce a voltage pulse on lead 1205, such pulse on lead 1205 being timed spaced, i. e., delayed, with respect to the appearance of a trigger on the input lead 12, in accordance with the value of voltage appearing at trigger time, on lead 1172. The circuitry for developing such pulse on lead 1205 is now described in detail.

AGCA system triggers appearing on the input lead 12 are coupled through condenser 1209 to the control grid of tube 1210, which has its cathode grounded and its control grid connected to a —150 volt source through resistances 1211 and 1213, the junction point of resistances 1212, 1213 being returned to ground through resistance 1214, and the anode of tube 1210 is connected together with the anode of tube 1204 to a +300 volt source through voltage dropping resistance 1215.

The cathode of tube 1204 is returned to ground through serially connected resistance 1218 and the so-called "touchdown adjust" resistance 1219, such resistance 1219 being shunted by resistance 1220.

The amplified trigger pulse appearing on the anode of tube 1210 is applied through condenser 1221 to the control grid of tube 1222 which has its cathode interconnected through the cathode of tube 1204 and which has its anode connected to a +300 volt source through resistance 1224. The control grid of tube 1222 is connected to a +300 volt source through resistance 1225 so that normally, in its quiescent state, tube 1222 is conducting heavily to cause the voltage on the cathode of tube 1204 to be relatively high during such quiescent period of tube 1222.

However, upon the application of a negative pulse from the anode of tube 1210, the flow of space current through tube 1222 is greatly diminished. The resulting pulse appearing on lead 1205, which is delayed in an amount depending upon the voltage of lead 1172, is applied to the pulse generator circuitry 1108. For that purpose, the cathode of tube 1204 is connected through condenser 1227 to the control grid of the trigger tube 1228 of the blocking oscillator stage 1108. This circuitry of the blocking oscillator stage is conventional and for that reason need not be described in detail, but functions to produce sharpened pulses at the cathode of the output tube 1230, such sharpened pulses being applied through condenser 1231 to the cursor output terminal 42.

Thus, the thyrite modified feedback voltage is applied as a range delay control potential causing the blocking of the oscillator blocking stage 1108 to occur at the desired range delay for the particular angular position specified.

*Channel glidepath and course display on cathode ray tube using re-arranged circuitry in Figures 13, 18A and 18B*

As explained herein, an "ideal" glidepath and course line are created electronically by adding algebraically, on the one hand, level shifted azimuth angle voltage and modified range voltage, i. e., reference voltage; and, on the other hand, the "ideal" course line is produced by adding algebraically level shifted azimuth angle voltage and modified range voltage, i. e., reference voltage. By this expedient two alternating voltages having a frequency in the order of two cycles per second but displaced many degrees in phase are developed. The zero crossover points of these cyclically varying voltages represent the "ideal" glidepath and course line, as the case may be.

These alternating voltages, as described elsewhere herein, are used to create angle gates for gating video applied to the range tracking circuit and also for developing azimuth and elevation position error control signals for transmission to an aircraft to control its flight.

The arrangement described presently has for its purpose to allow visual observation of the ideal glidepath and ideal course line as determined by thyrite elements 570 and 457 in the reference voltage generator (Figure 18A). To accomplish this purpose circuitry in Figures 13, 18A and 18B are re-arranged electrically. Such circuitry is re-arranged upon setting of the "track-cursor" switch 284 (Figure 13) to its cursor position. When set to the "track" position such switch 284 provides a function of normal automatic tracking or searching, as the case may be. When set to the "cursor" position the following conditions are effective: (1) the "video on" signal, which normally in tracking operation appears on lead 84, is replaced by a fixed potential of approximately 60 volts which is developed using a voltage dividing network which includes resistances 1000 and 1001, such resistances being serially connected between ground and a +150 volt source with the junction point of such resistances 1000 and 1001 connected to a stationary contact of the composite switch 284; (2) a second switch 1002 of the composite switch 284 causes the application of 28 volts to the relay winding 283 to effect operation of the associated single pole double throw relay switches 282 and 287, and such voltage of 28 volts is applied from the lead 1003; and (3) switch 1006 causes a —150 volt source to be connected to the control grid of tube V–17A through resistance 433 to thereby supply a high bias to tube V–17A to assure its cutoff so that it is ineffective to pass the late index mark.

Energization of the aforementioned relay winding 283 results in a re-arrangement of the circuitry associated with the tube V–9 which, as recalled, in the tracking function operates as a second integrator. With the circuitry re-arranged, tube V–9 serves as a D. C. amplifier with the amplified output appearing as a "range voltage" at the cathode of tube V–11B. More specifically, in such case the control grid of tube V–9 is connected through relay switch 282 and resistance 1008 to the terminal 64 to which is applied cursor information which is developed in the circuitry shown in Figures 18A, 18B as described hereinafter. In general, the input to tube V–9 comprises a D. C. voltage applied through the aforementioned resistance 1008 which is shunted by condenser 1009, the junction point of element 1008, 1009 being returned to ground through resistance 1010.

The anode of tube V–9 is connected through relay switch 289 to the control grid of tube V–10A since, in this condition, the relay winding 286 is energized. It is apparent that the amplified voltage on tube V–9 appears in modified form at the cathode of tube V–10B and thus on the range voltage lead 35. This voltage appearing on lead 35 is applied, as previously described, to the control grid of the delay multivibrator V–2A, and index marks are generated by the tube V–16, as described previously in connection with range tracking. The late index mark, however, is removed due to the bias voltage applied to the grid circuitry of tube V–17A. Thus, the output of mixer tube V–17B consists of the early marks only. The display as seen on the az.-el. indicator consists of the early index marks, occurring at such range delays and at such angles that they form a pattern plotting the computed course and glidepath lines. To achieve this result, such circuitry is provided in Figures 18A and 18B in the manner indicated in block diagram in Figure 23 for computing a servo loop in which a suitable continuous voltage is supplied to the input of tube V–9A over lead 1011, and a "range voltage" is supplied over lead 1012 to the thyrite reference generator.

With respect to Figures 18A, 18B and 23, the "range voltage" appearing on lead 35 is applied over lead 1012, i. e., terminal 82, to the same reference voltage generator used in the tracking function. As in the tracking function, azimuth and elevation angle voltages are shifted in level and applied to two identical amplifier channels after mixing with the range voltage as modified by the thyrite reference generator. Such amplifier channels, however, in this instance comprise only a portion of the corresponding azimuth and elevation angle tracking circuits. More specifically, the azimuth amplifier channel comprises the stages V–4A and V–28A only, and similarly the elevation amplifier channel includes the stages V–20A and V–31A only. The amplified voltage appearing on the anode of tube V–28A is applied through condenser 1013 to the lead 1014 which, in the de-energized condition of relay winding 1015, is connected to the control grid of tube V–4B. Tube V–4B is a cathode follower and has its cathode connected through lead 469 and resistance 1016 to the control grid of tube 465 to complete a feedback loop. It is noted that condenser 1017 is connected between the lead 1014 and ground and that the anode of tube V–28A is connected to a —150 volt source through the serially connected resistances 1018 and 1019. Resistances 1018 and 1019 are each one megohm. Condensers 1013 and 1017 have capacities respectively of 22 and 150 micro-microfarads.

The elevation circuitry is similar to the azimuth circuitry described and for that reason a detailed description of the elevation channel is not presented in this instance.

It is observed that in the normal AGCA system the range of the controlled aircraft is tracked by the range tracking unit and the range voltage which is developed serves as a command signal for the automatic system, in which case the angular position of the aircraft is the dependent function. However, when the system is being aligned or checked upon operation of the switching means, the continuously varying angle voltage is used together with a servo loop made up of portions of the tracking and computing system to reverse the normal loop such that the angle voltage is the command signal with the range voltage, i. e., an artificially created range voltage being the dependent function. Due to normal presentation of pips on the indicator representing the range voltage as a function of time, as the angle voltage goes through its normal scanning, the servo controls range voltage such that it represents the glide path range for each angular position. The technique so applied incorporates all scale factors, constants and parameters of the normal tracking and computing equipment and presents the results on the scope. Therefore, if there is any malfunction or misalignment of these components, the visual presentation will show the errors that exist, because the glide paths as represented on the scope or indicator represent the glide path that the system would fly an aircraft on if it were in normal operation, and this glide path may be compared with either cursors that are presented on the scope or terrestrial references. Thereby, this technique allows rapid checking and alignment of a complex tracking and computing system without the aid of additional test equipment.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an arrangement of the character described, means deriving a voltage, the intensity of which is representative of the range of an object being tracked, means deriving a voltage, the intensity of which is representative of the angular position of the tracked object, circuitry combining said first voltage and second voltage to produce an alternating voltage, the crossover points of which represent an ideal flight path for the object, and means including said circuitry for producing a visual representation of said flight path.

2. In an arrangement of the character described, means deriving an electrical characteristic representative of the range of an object being tracked, means producing a second electrical characteristic representative of the angular position of said object, circuitry combining said first characteristic and said second characteristic to produce a third characteristic which represents an ideal flight path for said object, and means including said circuitry for producing a visual representation of said flight path.

3. In an arrangement of the character described, means producing a first voltage which varies linearly with respect to the range of an object being tracked, means deriving a second voltage which is representative of the angular position of the object, a non-linear network, means coupling said first voltage to said non-linear network, circuitry combining said second voltage with said first voltage as modified by said non-linear network to produce an alternating voltage, the crossover or zero points of which are representative of an ideal flight path for the object, and means including said circuitry for producing a visual representation of said flight path.

4. In an arrangement of the character described, means deriving an electrical characteristic representative of an ideal glidepath of an object, means sensitive to said electrical characteristic for deriving a control signal representative of the deviation of the object from said glidepath, and means for producing a visual representation of said ideal glidepath.

5. In an arrangement of the character described, circuitry normally effective to derive an electrical characteristic representative of an ideal glidepath, means sensitive to said electrical characteristic for deriving control signals representative of the deviation of an object from said ideal glidepath, and means including at least a part of said circuitry for producing a visual representation of said glidepath.

6. In an arrangement of the character described, circuitry normally effective to produce an electrical characteristic representative of an ideal glidepath, means sensitive to said electrical characteristic for deriving a control signal representative of the deviation of an object from said ideal glidepath, a servo loop, normally ineffective as such and including at least part of said circuitry, a cathode ray tube coupled to said servo loop for producing a visual representation of said ideal glidepath, and switching means, effective upon actuation, to render said servo loop effective for producing said visual representation.

7. In an arrangement of the character described, a source of voltage, the instantaneous magnitude of which represents the range of an object being tracked, an electron discharge device having a control grid and a cathode, a non-linear circuit element coupled between said control grid and said cathode, means coupling said source to said non-linear circuit element, a source of voltage, the instantaneous magnitude of which is representative of the angular position of the object being tracked, a level shifting network coupled to said source for developing a level shifted voltage, means coupling said level shifted voltage to the output circuit of said electron discharge device to produce an alternating voltage, the zero crossover points of which are representative of an ideal flight path of the object, a servo loop normally ineffective as such and including said non-linear circuit element for producing a visual representation of said ideal flight path, and switching means effective to render said servo loop operative for producing said visual representation.

8. In a system of the character described, tracking means normally effective to track the position of an object, computing means sensitive to information derived from said tracking means for developing an electrical characteristic representative of the position of said object with reference to a predetermined flight path, visual indicating means, switching means, said switching means being effective, when operated, to interconnect elements of said tracking means and said computing means in a servo loop for deriving a second electrical characteristic representative of said predetermined flight path, and means applying said second electrical characteristic to said visual indicating means.

9. In a system of the character described, range tracking means for deriving a first electrical characteristic representative of the range of an object being tracked, means deriving a second electrical characteristic representative of the angular position of the tracked object, computing means sensitive to said first and second electrical characteristics to produce a third electrical characteristic representative of an ideal flight path for the object, visual indicating means, switching means operative to interconnect at least a portion of said tracking means and said computing means in a servo loop to derive a fourth electrical characteristic, and means applying said fourth electrical characteristic to said visual indicating means for visually indicating said ideal flight path.

10. In a system of the character described, first means normally deriving a first electrical characteristic representative of the range of an object being tracked, second means deriving a second electrical characteristic representative of the angular position of the tracked object, third means employing said first electrical characteristic to produce a third electrical characteristic representative of the ideal angular flight path for the object, switching means, visual indicating means, said switching means, when operated, being effective to interconnect at least a portion of said first and third means in a servo loop for deriving a fourth electrical characteristic, and means applying said fourth electrical characteristic to said visual indicating means to produce a visual representation of said flight path.

11. In a system of the character described, first means for deriving a first electrical characteristic representative of the ideal flight path of an object, echo responsive means for deriving video signals representative of the actual position of the object, means normally comparing said video signals with said first characteristic to develop a second characteristic representative of the deviation of said object from said predetermined flight path, visual indicating means, switching means, said switching means, when operated, being effective to interconnect at least a portion of said first means to said visual indicating means to produce a visual indication of said flight path.

References Cited in the file of this patent

UNITED STATES PATENTS

| | | |
|---|---|---|
| 2,405,231 | Newhouse | Aug. 6, 1946 |
| 2,459,481 | Wolff | Jan. 18, 1949 |
| 2,459,482 | Bond | Jan. 18, 1949 |
| 2,483,644 | Kelsey | Oct. 4, 1949 |
| 2,555,010 | Alvarez | May 29, 1951 |
| 2,572,725 | Hirsch | Oct. 23, 1951 |
| 2,585,855 | Sherwin | Feb. 12, 1952 |